(12) United States Patent
Agarwal et al.

(10) Patent No.: US 11,910,452 B2
(45) Date of Patent: Feb. 20, 2024

(54) AUTOMATICALLY CONNECTING WIRELESS COMPUTING DEVICES BASED ON RECURRING WIRELESS SIGNAL DETECTIONS

(71) Applicant: Lyft, Inc., San Francisco, CA (US)

(72) Inventors: Sachin Agarwal, San Francisco, CA (US); Megha Chhabra, San Francisco, CA (US); Luke Greenwood, San Francisco, CA (US); Xiaofan Hu, San Francisco, CA (US); Ryan Tancredi, San Francisco, CA (US); Sergey Shlykovich, Issaquah, WA (US); Xinran Wang, San Francisco, CA (US); Shuchang Zheng, Redwood City, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/424,164

(22) Filed: May 28, 2019

(65) Prior Publication Data

US 2020/0383153 A1    Dec. 3, 2020

(51) Int. Cl.
*H04L 12/28* (2006.01)
*H04W 76/14* (2018.01)
(Continued)

(52) U.S. Cl.
CPC .......... *H04W 76/14* (2018.02); *H04B 17/318* (2015.01); *H04W 4/022* (2013.01); *H04W 12/50* (2021.01); *H04W 12/63* (2021.01)

(58) Field of Classification Search
CPC ....................................................... H04L 12/28
(Continued)

(56) References Cited

U.S. PATENT DOCUMENTS

| D119,041 S | 2/1940 | MacDonald et al. |
|---|---|---|
| D205,209 S | 7/1966 | Priddis |

(Continued)

FOREIGN PATENT DOCUMENTS

| CA | 174696 | 8/2019 |
|---|---|---|
| CN | 104992509 A | 10/2015 |

(Continued)

OTHER PUBLICATIONS

Examination Report as received in Australian Application 2017336943 dated Dec. 20, 2019.

(Continued)

*Primary Examiner* — Dang T Ton
(74) *Attorney, Agent, or Firm* — Keller Preece PLLC

(57) ABSTRACT

This disclosure relates to methods, non-transitory computer readable media, and client devices that automatically initiate a wireless network connection (e.g., a pairing) with an auxiliary computing device based on recurring detection of a wireless broadcast signal from the auxiliary computing device. Upon detecting a wireless broadcast signal for an auxiliary computing device satisfying a signal-strength threshold at multiple times or locations, for example, the disclosed client devices can automatically initiate a wireless network connection (e.g., a pairing) with the auxiliary computing device. By automatically initiating a wireless connection with such an auxiliary computing device, the disclosed client devices obviate inefficient user interactions conventional computing devices use to establish a pairing, facilitate pairings with auxiliary computing devices for unsavvy technology users, and avoid unsecure wireless connections that may compromise data on the disclosed provider client devices.

20 Claims, 13 Drawing Sheets

(51) Int. Cl.
*H04W 4/021* (2018.01)
*H04B 17/318* (2015.01)
*H04W 12/50* (2021.01)
*H04W 12/63* (2021.01)

(58) Field of Classification Search
USPC ........................................................ 370/329
See application file for complete search history.

(56) References Cited

U.S. PATENT DOCUMENTS

| | | |
|---|---|---|
| D306,042 S | 2/1990 | Evenson |
| D307,447 S | 4/1990 | Evenson |
| D319,848 S | 9/1991 | Hofman |
| D320,235 S | 9/1991 | Hofman |
| D327,506 S | 6/1992 | Bartholomai et al. |
| D374,191 S | 10/1996 | Terrebonne et al. |
| 5,918,397 A | 7/1999 | Elmer |
| D418,493 S | 1/2000 | Jobs et al. |
| 6,028,537 A | 2/2000 | Suman et al. |
| 6,271,805 B1 | 8/2001 | Yonezawa |
| D493,454 S | 7/2004 | Andre et al. |
| 6,759,965 B1 | 7/2004 | Hatjasalo et al. |
| D508,538 S | 8/2005 | Furr |
| D521,471 S | 5/2006 | Hoehn et al. |
| D527,359 S | 8/2006 | Rashid |
| D567,876 S | 4/2008 | Au et al. |
| 7,360,248 B1 | 4/2008 | Kanevsky et al. |
| D582,394 S | 12/2008 | Hong et al. |
| D624,557 S | 9/2010 | Allen et al. |
| D642,159 S | 7/2011 | Joseph |
| D659,677 S | 5/2012 | Kim et al. |
| 8,823,508 B2 | 9/2014 | Thiruvengada et al. |
| D732,049 S | 6/2015 | Amin |
| 9,066,206 B2 | 6/2015 | Lin et al. |
| 9,070,101 B2 * | 6/2015 | Abhyanker .......... G06Q 10/087 |
| D734,349 S | 7/2015 | Amin et al. |
| D738,901 S | 9/2015 | Amin |
| 9,151,614 B2 | 10/2015 | Poppen et al. |
| D743,978 S | 11/2015 | Amin |
| 9,230,292 B2 | 1/2016 | Amin et al. |
| D749,116 S | 2/2016 | Luo |
| D749,543 S | 2/2016 | Lovegrove |
| D750,110 S | 2/2016 | Amin et al. |
| D754,675 S | 4/2016 | Vazquez et al. |
| 9,327,641 B1 | 5/2016 | Bowe et al. |
| D759,032 S | 6/2016 | Amin et al. |
| 9,392,418 B2 | 7/2016 | Lubeck |
| D763,894 S | 8/2016 | Lamparelli |
| D766,302 S | 9/2016 | Phelan et al. |
| 9,442,888 B2 | 9/2016 | Stanfield et al. |
| 9,459,622 B2 | 10/2016 | Abhyanker |
| D772,454 S | 11/2016 | Ma |
| 9,494,938 B1 | 11/2016 | Kemler et al. |
| D773,941 S | 12/2016 | Holzer |
| 9,536,271 B2 | 1/2017 | Kalanick et al. |
| 9,552,564 B1 | 1/2017 | Martenis |
| 9,628,975 B1 | 4/2017 | Watkins et al. |
| 9,635,319 B1 | 4/2017 | Englander et al. |
| 9,650,007 B1 | 5/2017 | Snyder et al. |
| 9,754,338 B2 | 9/2017 | Haparnas et al. |
| 9,769,616 B1 | 9/2017 | Pao et al. |
| 9,787,951 B2 | 10/2017 | Kannon et al. |
| D803,812 S | 11/2017 | Liu et al. |
| 9,827,897 B1 | 11/2017 | Muir |
| D806,293 S | 12/2017 | Pennington |
| D812,609 S | 3/2018 | Kimbrough et al. |
| D819,068 S | 5/2018 | Scheel et al. |
| 9,965,960 B1 | 5/2018 | McDavitt-Van Fleet |
| 10,147,154 B2 | 12/2018 | Haparnas et al. |
| 10,300,876 B1 | 5/2019 | Jacob et al. |
| 10,310,505 B1 * | 6/2019 | Hanson et al. ....... H04W 28/10 |
| D854,568 S | 7/2019 | Hu |
| 10,365,783 B2 | 7/2019 | Bowden et al. |
| 10,400,975 B1 | 9/2019 | Bushre |
| D868,895 S | 12/2019 | McMillin et al. |
| D875,115 S | 2/2020 | Yan |
| D875,133 S | 2/2020 | Wang et al. |
| 10,554,783 B2 | 2/2020 | Matthiesen et al. |
| D879,804 S | 3/2020 | Corona et al. |
| D880,498 S | 4/2020 | Shahidi et al. |
| D880,499 S | 4/2020 | Fatnani et al. |
| 10,636,108 B2 | 4/2020 | Eyler et al. |
| 10,688,919 B2 | 6/2020 | Kalanick et al. |
| D896,237 S | 9/2020 | Bentley et al. |
| 10,759,442 B2 | 9/2020 | Stenneth et al. |
| 10,791,536 B1 | 9/2020 | Murphy |
| D904,425 S | 12/2020 | Paul |
| D907,660 S | 1/2021 | Lee et al. |
| D912,686 S | 3/2021 | Yang |
| D915,440 S | 4/2021 | Kim et al. |
| D915,449 S | 4/2021 | Menninger |
| D916,720 S | 4/2021 | Park et al. |
| D916,764 S | 4/2021 | Kirsanov et al. |
| D917,544 S | 4/2021 | Wong |
| D931,902 S | 9/2021 | Moore et al. |
| 11,118,930 B2 | 9/2021 | Eyler et al. |
| D935,443 S | 11/2021 | Yuan |
| 11,443,398 B2 | 9/2022 | Haparnas et al. |
| D967,266 S | 10/2022 | McMillin et al. |
| 2002/0065046 A1 | 5/2002 | Mankins et al. |
| 2003/0217150 A1 | 11/2003 | Roese et al. |
| 2004/0243430 A1 | 12/2004 | Horstemeyer |
| 2005/0030224 A1 | 2/2005 | Koch |
| 2005/0100329 A1 | 5/2005 | Lao et al. |
| 2005/0109075 A1 | 5/2005 | Kithil et al. |
| 2006/0290158 A1 | 12/2006 | Cullison |
| 2007/0133210 A1 | 6/2007 | Watson et al. |
| 2007/0179709 A1 | 8/2007 | Doyle |
| 2008/0084360 A1 | 4/2008 | Shingai |
| 2008/0114629 A1 | 5/2008 | Pavlov |
| 2008/0195428 A1 | 8/2008 | O'Sullivan |
| 2008/0284578 A1 | 11/2008 | Mouratidis |
| 2009/0044235 A1 | 2/2009 | Davidson |
| 2009/0099732 A1 | 4/2009 | Pisz |
| 2009/0160229 A1 | 6/2009 | Mabuchi et al. |
| 2009/0248283 A1 | 10/2009 | Bicego, Jr. |
| 2009/0319181 A1 | 12/2009 | Khosravy et al. |
| 2010/0112945 A1 | 5/2010 | Hanif |
| 2010/0283609 A1 | 11/2010 | Remer |
| 2011/0156894 A1 | 6/2011 | Lin et al. |
| 2011/0195758 A1 | 8/2011 | Damale |
| 2011/0301985 A1 | 12/2011 | Camp et al. |
| 2012/0081389 A1 | 4/2012 | Dilts |
| 2012/0137256 A1 | 5/2012 | Lalancette et al. |
| 2012/0290652 A1 | 11/2012 | Boskovic |
| 2013/0018795 A1 | 1/2013 | Kolhatkar et al. |
| 2013/0096827 A1 | 4/2013 | McCall et al. |
| 2013/0132140 A1 | 5/2013 | Amin et al. |
| 2013/0332026 A1 | 12/2013 | McKown |
| 2014/0011522 A1 | 1/2014 | Lin et al. |
| 2014/0129951 A1 | 5/2014 | Amin et al. |
| 2014/0172727 A1 | 6/2014 | Abhyanker et al. |
| 2014/0266594 A1 | 9/2014 | Reiser |
| 2015/0148989 A1 | 5/2015 | Cooper et al. |
| 2015/0161564 A1 | 6/2015 | Sweeney et al. |
| 2015/0161752 A1 | 6/2015 | Barreto et al. |
| 2015/0166009 A1 | 6/2015 | Outwater et al. |
| 2015/0199664 A1 | 7/2015 | Buckman et al. |
| 2015/0210287 A1 | 7/2015 | Penilla et al. |
| 2015/0262430 A1 | 9/2015 | Farrelly et al. |
| 2015/0271290 A1 | 9/2015 | Tao et al. |
| 2015/0289109 A1 | 10/2015 | Lubeck et al. |
| 2015/0317801 A1 | 11/2015 | Bentley et al. |
| 2015/0332425 A1 | 11/2015 | Kalanick et al. |
| 2015/0339923 A1 | 11/2015 | Konig |
| 2015/0348408 A1 | 12/2015 | Demisse |
| 2015/0352947 A1 | 12/2015 | Hubschman et al. |
| 2015/0356470 A1 | 12/2015 | Mitchell |
| 2016/0016526 A1 | 1/2016 | Louboutin |
| 2016/0027307 A1 | 1/2016 | Abhyanker et al. |
| 2016/0034828 A1 | 2/2016 | Sarawgi et al. |
| 2016/0034845 A1 | 2/2016 | Hiyama et al. |
| 2016/0086391 A1 | 3/2016 | Ricci |

(56) References Cited

U.S. PATENT DOCUMENTS

| | | |
|---|---|---|
| 2016/0093212 A1 | 3/2016 | Barfield, Jr. et al. |
| 2016/0094964 A1 | 3/2016 | Barfield, Jr. et al. |
| 2016/0117610 A1 | 4/2016 | Ikeda |
| 2016/0119260 A1 | 4/2016 | Ghafourifar et al. |
| 2016/0140649 A1 | 5/2016 | Kleve et al. |
| 2016/0292596 A1 | 10/2016 | Gaitan et al. |
| 2016/0293012 A1 | 10/2016 | Lubeck |
| 2016/0321566 A1 | 11/2016 | Liu et al. |
| 2016/0321771 A1 | 11/2016 | Liu et al. |
| 2016/0334232 A1 | 11/2016 | Zhuang |
| 2016/0349067 A1 | 12/2016 | Fowe |
| 2016/0364678 A1 | 12/2016 | Cao |
| 2017/0038948 A1 | 2/2017 | Cun et al. |
| 2017/0052034 A1 | 2/2017 | Magazinik |
| 2017/0053574 A1 | 2/2017 | Byrd |
| 2017/0090850 A1 | 3/2017 | Amrhein et al. |
| 2017/0115125 A1 | 4/2017 | Outwater et al. |
| 2017/0124835 A1 | 5/2017 | Boyina et al. |
| 2017/0147959 A1 | 5/2017 | Sweeney et al. |
| 2017/0178269 A1 | 6/2017 | McKinnon et al. |
| 2017/0193404 A1 | 7/2017 | Yoo et al. |
| 2017/0193826 A1 | 7/2017 | Marueli et al. |
| 2017/0270794 A1 | 9/2017 | Sweeney |
| 2017/0305332 A1 | 10/2017 | Albou et al. |
| 2017/0350719 A1 | 12/2017 | Moore et al. |
| 2018/0047091 A1 | 2/2018 | Ogden et al. |
| 2018/0053215 A1 | 2/2018 | E Costa |
| 2018/0060827 A1 | 3/2018 | Abbas et al. |
| 2018/0089605 A1 | 3/2018 | Poornachandran et al. |
| 2018/0189713 A1 | 7/2018 | Matthiesen et al. |
| 2018/0191863 A1 | 7/2018 | Matthiesen et al. |
| 2018/0203591 A1 | 7/2018 | Callen et al. |
| 2018/0262891 A1 | 9/2018 | Wu et al. |
| 2019/0050787 A1 | 2/2019 | Munafo et al. |
| 2019/0073738 A1 | 3/2019 | Haparnas et al. |
| 2019/0283763 A1 | 9/2019 | Wang |
| 2020/0104601 A1 | 4/2020 | Karoui et al. |
| 2020/0105130 A1 | 4/2020 | Chen et al. |
| 2020/0107226 A1* | 4/2020 | Raleigh ................ H04W 28/10 |
| 2020/0126325 A1 | 4/2020 | Jeon et al. |
| 2020/0151675 A1 | 5/2020 | McCormack |
| 2020/0228628 A1 | 7/2020 | Matthiesen et al. |
| 2021/0097315 A1 | 4/2021 | Carruthers et al. |
| 2021/0118078 A1 | 4/2021 | Wang et al. |
| 2021/0192241 A1 | 6/2021 | Zhu et al. |
| 2021/0402942 A1 | 12/2021 | Torabi et al. |
| 2022/0237277 A1 | 7/2022 | Rahman et al. |
| 2022/0238052 A1 | 7/2022 | Vitiello et al. |
| 2022/0358800 A1 | 11/2022 | Ham |

FOREIGN PATENT DOCUMENTS

| | | |
|---|---|---|
| CN | 304613845 | 5/2018 |
| EP | 2605459 A1 | 6/2013 |
| JP | 2003-151081 A | 5/2003 |
| JP | 2004-038672 A | 2/2004 |
| JP | 2004-078639 A | 3/2004 |
| JP | 3818127 B2 | 9/2006 |
| JP | 3975380 B2 | 9/2007 |
| JP | 2016-182855 A | 10/2016 |
| KR | 10-2010-0129531 A | 12/2010 |
| KR | 2012-0024135 A | 3/2012 |
| KR | 10-2015-0045962 A | 4/2015 |
| KR | 10 1518140 B1 | 5/2015 |
| KR | 2016-0063474 A | 6/2016 |
| WO | WO 2008/100489 A2 | 8/2008 |
| WO | WO 2018/064532 | 4/2018 |
| WO | WO 2018/125827 | 7/2018 |
| WO | WO 2018/125831 | 7/2018 |

OTHER PUBLICATIONS

International Search Report and Written Opinion as received in PCT/2017/054409 dated Jan. 10, 2018.
International Search Report and Written Opinion as received in PCTUS2017068283, dated Apr. 17, 2018.
International Search Report & Written Opinion as received in PCT/US2017/068295 dated Apr. 23, 2018.
Office Action as received in Canadian Application 3,035,259 dated Feb. 20, 2020.
Range: For Youth, apppicker.com [online], released on Apr. 10, 2014, [retrieved on Feb. 6, 2020], retrieved from the Internet <URL: https://www.apppicker.com/apps/853769848/range-for-youth> (Year: 2014).
Examiner's Report as received in Canadian application 174696 dated May 17, 2018.
Examiner's Report as received in Canadian application 174696 dated Feb. 6, 2018.
Examiner's Report as received in Canadian application 181231 dated May 17, 2018.
Examiner's Report as received in Canadian application 181231 dated Feb. 6, 2019.
First Examination Report as received in Indian patent application 293635 dated Jun. 8, 2017.
First Examination Report as received in Indian patent application 293636 dated Jun. 13, 2017.
Office Action as received in Mexican Application MX/f/2017/001364 date Jul. 20, 2020 [No English translation available].
U.S. Appl. No. 29/650,461, Feb. 12, 2020, Office Action.
U.S. Appl. No. 29/650,461, May 13, 2020, Notice of Allowance.
U.S. Appl. No. 15/396,417, May 5, 2017, Office Action.
U.S. Appl. No. 15/396,417, Sep. 5, 2017, Office Action.
U.S. Appl. No. 15/396,417, Jun. 14, 2018, Office Action.
U.S. Appl. No. 15/396,417, Jan. 10, 2019, Office Action.
U.S. Appl. No. 15/396,417, Sep. 26, 2019, Office Action.
U.S. Appl. No. 15/396,417, Feb. 11, 2020, Notice of Allowance.
U.S. Appl. No. 15/396,390, Mar. 7, 2019, Office Action.
U.S. Appl. No. 15/396,390, Oct. 8, 2019, Notice of Allowance.
U.S. Appl. No. 15/396,164, Mar. 22, 2019, Office Action.
U.S. Appl. No. 15/396,164, Oct. 31, 2019, Office Action.
U.S. Appl. No. 15/396,164, Apr. 22, 2020, Office Action.
U.S. Appl. No. 29/584,381, Jan. 4, 2019, Restriction Requirement.
U.S. Appl. No. 29/584,381, Apr. 12, 2019, Office Action.
U.S. Appl. No. 29/584,381, Jul. 25, 2019, Notice of Allowance.
U.S. Appl. No. 16/749,798, Oct. 7, 2020, Office Action.
U.S. Appl. No. 29/748,123, Jan. 7, 2021, Office Action.
U.S. Appl. No. 15/396,164, Nov. 23, 2020, Office Action.
U.S. Appl. No. 16/834,820, Dec. 8, 2022, Office Action.
U.S. Appl. No. 16/852,253, Nov. 1, 2022, Office Action.
U.S. Appl. No. 17/343,419, Nov. 8, 2022, Office Action.
U.S. Appl. No. 29/747,914, Dec. 5, 2022, Restriction Requirement.
U.S. Appl. No. 14/880,042, Jun. 23, 2016, Office Action.
U.S. Appl. No. 14/880,042, Nov. 29, 2016, Office Action.
U.S. Appl. No. 14/880,042, Apr. 19, 2017, Notice of Allowance.
U.S. Appl. No. 15/680,571, Apr. 2, 2018, Office Action.
U.S. Appl. No. 15/680,571, Aug. 14, 2018, Notice of Allowance.
U.S. Appl. No. 16/171,860, Aug. 19, 2019, Office Action.
U.S. Appl. No. 16/171,860, Nov. 19, 2019, Notice of Allowance.
U.S. Appl. No. 16/171,860, Dec. 30, 2019, Office Action.
U.S. Appl. No. 16/171,860, Jun. 30, 2020, Office Action.
U.S. Appl. No. 16/171,860, Sep. 21, 2020, Office Action.
U.S. Appl. No. 16/171,860, Jan. 12, 2021, Office Action.
U.S. Appl. No. 16/171,860, Feb. 11, 2022, Office Action.
U.S. Appl. No. 16/171,860, May 17, 2022, Notice of Allowance.
U.S. Appl. No. 17/822,665, Jan. 13, 2023, Office Action.
U.S. Appl. No. 29/748,123, May 14, 2021, Office Action.
U.S. Appl. No. 15/396,164, Jul. 20, 2021, Office Action.
Examiner's Report as received in Canadian application 3,035,259 dated May 5, 2021.
H. A. N. C. Bandara, A Multi-Agent System for Dynamic Ride Sharing, Dec. 28-31, 2009, Fourth International Conference on Industrial and Information Systems, ICIIS 2009 (Year: 2009).
U.S. Appl. No. 15/396,164, Sep. 22, 2022, Notice of Allowance.
U.S. Appl. No. 16/852,253, Jul. 15, 2022, Office Action.
U.S. Appl. No. 15/396,164, Apr. 8, 2022, Office Action.
U.S. Appl. No. 29/713,840, Apr. 5, 2022, Ex Parte Quayle Action.
U.S. Appl. No. 29/713,840, Jun. 14, 2022, Notice of Allowance.

(56) References Cited

OTHER PUBLICATIONS

U.S. Appl. No. 16/834,820, May 4, 2022, Office Action.
U.S. Appl. No. 17/343,419, Jun. 20, 2022, Office Action.
U.S. Appl. No. 16/834,820, Mar. 16, 2023, Office Action.
U.S. Appl. No. 16/852,253, Feb. 28, 2023, Office Action.
U.S. Appl. No. 17/343,419, Mar. 15, 2023, Notice of Allowance.
U.S. Appl. No. 29/747,914, Feb. 27, 2023, Office Action.
U.S. Appl. No. 29/747,914, Apr. 12, 2023, Notice of Allowance.
U.S. Appl. No. 16/852,253, Jul. 3, 2023, Office Action.
U.S. Appl. No. 17/822,665, May 30, 2023, Office Action.
U.S. Appl. No. 16/749,798, Feb. 9, 2021, Notice of Allowance.
U.S. Appl. No. 16/749,798, Sep. 14, 2023, Notice of Allowance.
U.S. Appl. No. 16/852,253, Oct. 12, 2023, Office Action.
U.S. Appl. No. 17/822,665, Sep. 11, 2023, Notice of Allowance.

\* cited by examiner

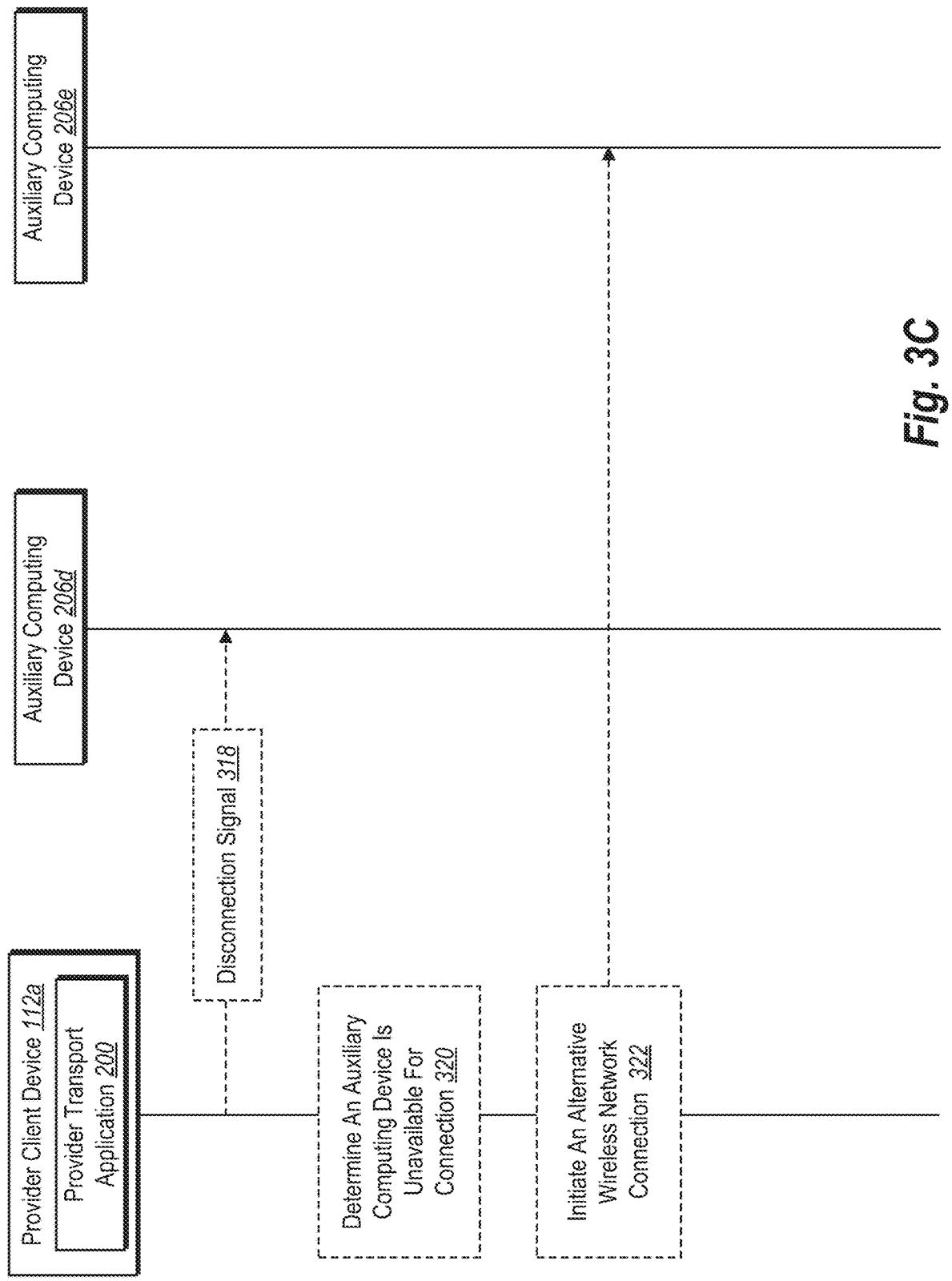

AUTOMATICALLY CONNECTING WIRELESS COMPUTING DEVICES BASED ON RECURRING WIRELESS SIGNAL DETECTIONS

BACKGROUND

Computing devices commonly use standardized wireless protocols to detect wireless broadcast signals and connect to other computing devices for data exchange. For example, a first computing device may detect a BLUETOOTH ("Bluetooth") broadcast signal from a second computing device and (upon transmitting a code or other security credentials) pair with the second computing device to exchange data. As a further example, a computing device may detect a wireless fidelity or WI-FI ("Wi-Fi") broadcast signal from an Internet router or another computing device and (upon transmitting a code or other security credentials) connect with the router or other computing device to exchange data over a local area network.

To make such a connection, a computing device commonly presents various graphical user interfaces and options for a user to select detected computing devices for connection within range and for the computing device to detect entry of security credentials. For instance, some computing devices comprise software applications that, when executed, cause a computing device to present a graphical user interface or window comprising networks (or computing devices) detected within a particular range. A mobile device, for example, may include a separate settings application or networks application that (upon detecting selection of the application) causes the mobile device to present a user interface comprising previously connected devices, previously used networks, or publicly detectable devices or networks.

As computing devices and applications with wireless capabilities become more common, however, wireless connection protocols pose several technical limitations and cyber security risks. For instance, a user unfamiliar with a software application's options or user interfaces may not determine (or not attempt to determine) how to connect a computing device with a target computing device using a wireless connection protocol, such as Bluetooth or Wi-Fi. In environments with numerous wireless computing devices, by contrast, a computing device may detect multiple other computing devices broadcasting a wireless broadcast signal and present each newly detected device (and some previously detected devices) in a menu or list for a graphical user interface. With multiple detected or saved keys for wireless broadcast signals, the computing device's display of multiple signals may confuse a user into selecting the wrong identifier or name for a target computing device. Worse yet, a computing device may identify and connect with another computing device broadcasting a wireless broadcast signal comprising an identifier or name that mimics a secure or previously used network, such as when a computing device broadcasts a wireless broadcast signal in an act of phishing or Bluejacking.

Whether a computing device fails to connect with a target computing device or connects with the wrong target computing device, a failure to connect (or wrong connection) prevents some computing devices from one or both of exchanging data and executing device capabilities dependent on such data exchange. In some cases, for instance, a computing device that fails to connect to an in-vehicle-computing device prevents the in-vehicle-computing device from communicating messages, capturing images, or generating audio as part of a transportation matching system. Such connection failures can inhibit one or both of a requestor of transportation and a provider of transportation from engaging the capabilities of in-vehicle-display devices for messaging, in-vehicle cameras for capturing images, or in-vehicle speakers for generating audio.

SUMMARY

This disclosure describes one or more embodiments of methods, non-transitory computer readable media, and computing devices that solve the foregoing problems in addition to providing other benefits. In particular, the disclosed provider client devices automatically initiate a wireless network connection (e.g., a pairing) with an auxiliary computing device based on recurring detection of a wireless broadcast signal from the auxiliary computing device. Upon detecting a wireless broadcast signal from an auxiliary computing device satisfying a signal-strength threshold at multiple times or locations, for example, the disclosed provider client devices can automatically initiate a wireless network connection (e.g., a pairing) with the auxiliary computing device. By automatically initiating a wireless connection with such an auxiliary computing device, the disclosed provider client devices obviate inefficient user interactions conventional computing devices use to establish a pairing, facilitate pairings with auxiliary computing devices for unsavvy technology users, and avoid unsecure wireless connections that may compromise data on the disclosed provider client devices.

In some embodiments, for instance, a provider client device detects a wireless broadcast signal at a first time period, where the wireless broadcast signal comprises a device identifier for an auxiliary computing device. The provider client device further determines that the wireless broadcast signal from the auxiliary computing device satisfies a signal-strength threshold at the first time period. After the first time period, the provider client device again detects the wireless broadcast signal from the auxiliary computing device and determines that the wireless broadcast signal satisfies the signal-strength threshold at a second time period. Based on determining that the wireless broadcast signal from the auxiliary computing device satisfies the signal-strength threshold at the first and second (and sometimes additional) time periods, the provider client device initiates a wireless network connection between the provider client device and the auxiliary computing device.

BRIEF DESCRIPTION OF THE DRAWINGS

The detailed description refers to the drawings briefly described below.

FIGS. 3A-3C illustrate sequence-flow diagrams of a provider client device automatically initiating a wireless network connection with an auxiliary computing device based on recurring detection of a wireless broadcast signal from the auxiliary computing device in accordance with one or more embodiments.

DETAILED DESCRIPTION

Figure 1:
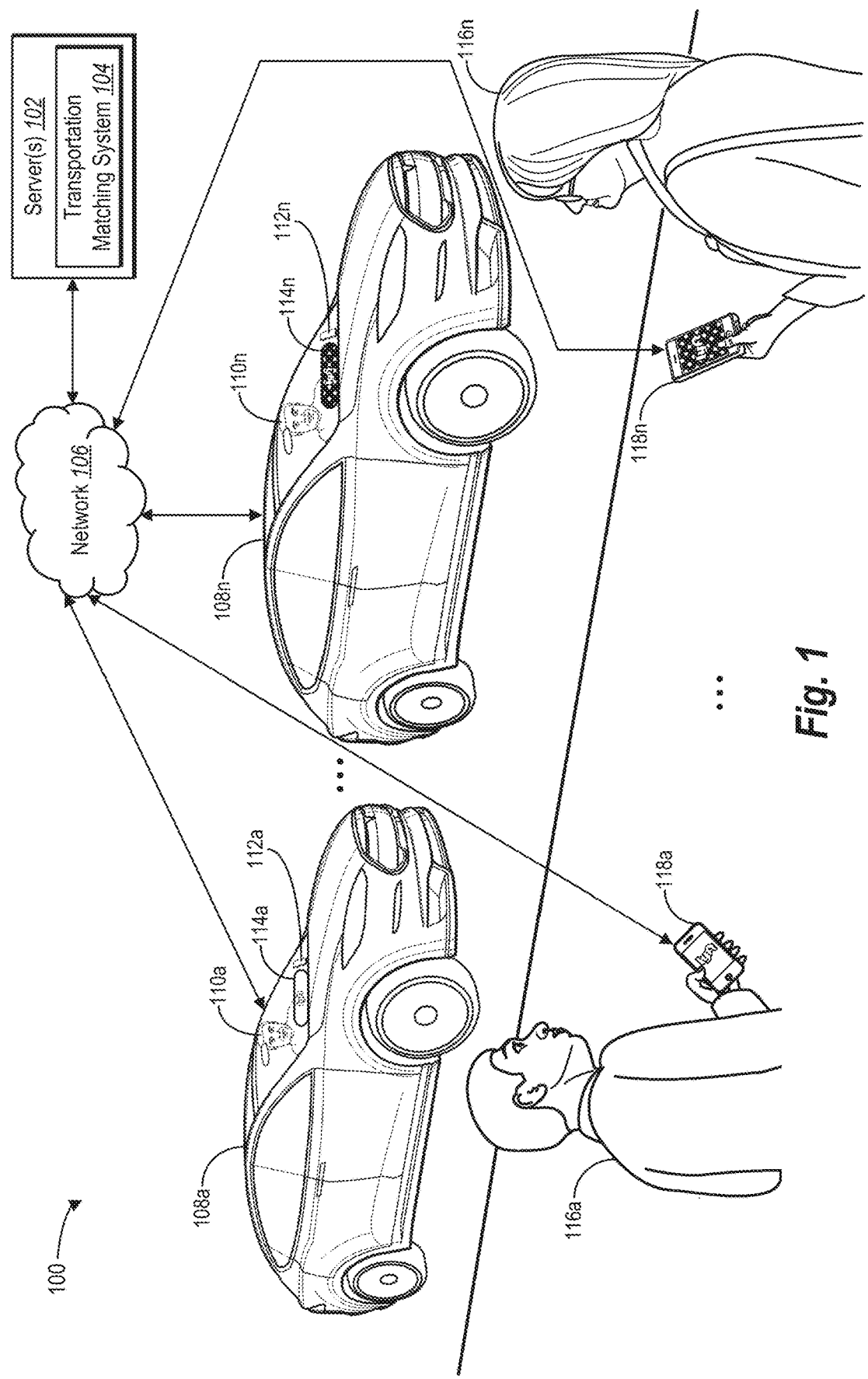
FIG. 1 illustrates a block diagram of an environment for implementing a transportation matching system and a provider client device in accordance with one or more embodiments.

This disclosure describes one or more embodiments of a provider client device that automatically initiates a wireless network connection (e.g., a pairing) with an auxiliary computing device based on recurring detection of a wireless broadcast signal from the auxiliary computing device. At any given time period, such an auxiliary computing device may be one of multiple auxiliary computing devices from which the provider client device detects a wireless broadcast signal. Upon detecting a wireless broadcast signal from an auxiliary computing device satisfying a signal-strength threshold at multiple time intervals or locations, for example, the disclosed provider client device can automatically initiate a wireless network connection (e.g., a pairing) with the auxiliary computing device. The provider client device can accordingly initiate such connections without user interaction identifying a specific auxiliary computing device with which to connect. By automatically initiating a wireless connection with an auxiliary computing device, the disclosed provider client device obviates inefficient user interactions that conventional computing devices use to pair, facilitate pairings with auxiliary computing devices for unsavvy technology users, and avoid unsecure wireless connections that may compromise data on the provider client device.

In some embodiments, for instance, a provider client device detects multiple wireless broadcast signals from multiple auxiliary computing devices at a first time period. Each such wireless broadcast signal comprises a particular device identifier for a particular auxiliary computing device. The provider client device further determines that a wireless broadcast signal from the multiple wireless broadcast signals satisfies a signal-strength threshold at the first time period, where the wireless broadcast signal comprises a device identifier for an auxiliary computing device from the multiple auxiliary computing devices. After the first time period, the provider client device again detects the wireless broadcast signal from the auxiliary computing device and determines that the wireless broadcast signal satisfies the signal-strength threshold at a second time period. Based on determining that the wireless broadcast signal from the auxiliary computing device satisfies the signal-strength threshold at the first and second (and sometimes additional) time periods, the provider client device initiates a wireless network connection between the provider client device and the auxiliary computing device.

As suggested above, the provider client device may correspond to (or be used by) a provider operating a transportation vehicle. In some cases, the provider client device comprises a provider transport application that facilitates matching requestors with providers for a transportation matching system. The provider client device may also detect wireless broadcast signals from (and initiate a wireless network connection with) various types of auxiliary computing devices. Such auxiliary computing devices include, but are not limited to, in-vehicle-display devices, wireless cameras, wireless video cameras, and wireless speakers. Conversely, in some embodiments, a requestor client device corresponding to a requestor of transportation for a transportation matching system can perform functions of a provider client device as described in this disclosure. Accordingly, in such embodiments, the requestor client device can likewise detect wireless broadcast signals from auxiliary computing devices and automatically initiate a wireless network connection with an auxiliary computing device. Despite the auxiliary computing device sending wireless broadcast signals to and (in some cases) receiving corresponding signals from multiple requestor client devices in a given day, the requestor client device can still initiate such a wireless network connection.

Before automatically initiating such a wireless network connection, in some embodiments, the provider transport application causes the provider client device to present an automatic-connection option within a graphical user interface. Upon detecting a selection by a provider of the automatic-connection option, the provider client device receives authorization or permission from the provider to automatically initiate a wireless network connection with an auxiliary computing device selected according to instructions of the provider transport application.

When detecting wireless broadcast signals, the provider client device can detect Bluetooth broadcast signals or Wi-Fi broadcast signals, including a Bluetooth broadcast signal or a Wi-Fi broadcast signal from an auxiliary computing device with which the provider client device eventually initiates a wireless network connection. To select the auxiliary computing device for initial connection or pairing, the provider client device accordingly determines whether a particular wireless broadcast signal corresponding to a particular auxiliary computing device satisfies a signal-strength threshold at a given time. For example, the provider client device may determine that a Bluetooth or a Wi-Fi broadcast signal corresponds to a strongest Bluetooth or Wi-Fi broadcast signal from among multiple Bluetooth or Wi-Fi broadcast signals, respectively, at a given time period.

Various provider client device functions or events can trigger the provider client device to scan for and detect wireless broadcast signals. For instance, in some embodiments, the provider client device detects wireless broadcast signals at a given time period based on time intervals, such as by detecting wireless broadcast signals at various time periods for a threshold number of time intervals. Further, in certain implementations, the provider client device detects wireless broadcast signals at a given time period based on the provider client device launching a provider transport application. Additionally, or alternatively, the provider client device detects wireless broadcast signals at a given time period based on location, such as by detecting wireless broadcast signals at a first location at a first time period and (after traveling a threshold distance) detecting wireless broadcast signals at second location at a second time period.

In addition to detecting wireless broadcast signals from (and initiating a wireless network connection with) an auxiliary computing device, the disclosed provider client device optionally stores information to track (or scan for) an auxiliary computing device. When the auxiliary computing device is unavailable for connection, the provider client device optionally identifies an alternative auxiliary computing device with which to initiate a wireless connection. To store or remember information for a particular auxiliary computing device, for example, the provider client device can store a device identifier for the auxiliary computing device based on determining that the wireless broadcast signal from the auxiliary computing device satisfies a signal-strength threshold at a given time period. If the provider client device determines that the auxiliary computing device is no longer broadcasting a wireless broadcast signal or is otherwise unavailable for connection, in some embodiments, the provider client device identifies an alternative wireless broadcast signal from an alternative auxiliary computing device with which to initiate a wireless network connection based on recurring detection of the alternative wireless broadcast signal.

As suggested above, the provider client device improves and overcomes several technical deficiencies that hinder conventional wireless computing devices. For instance, the provider client device improves the computing efficiency and speed with which a client device initially connects to (or pairs with) an auxiliary computing device. Conventional computing devices commonly present various graphical user interfaces and selectable options for detecting and connecting with auxiliary computing devices. But presenting such user interfaces and options consumes computing resources and requires a series of user interactions with the conventional computing device. In contrast to conventional computing devices, the disclosed provider client device obviates such inefficient user interactions and reduces presentation of various graphical user interfaces. By detecting and evaluating the signal strength of wireless broadcast signals across time periods, locations, or application launches, the disclosed provider client device avoids such inefficiencies and automatically initiates a wireless network connection with an auxiliary computing device.

In addition to improved computing efficiency, in some embodiments, the disclosed provider client device improves the accuracy with which a client device initially connects (or pairs with) an auxiliary computing device. As noted above, some conventional client devices present newly detected devices and previously detected devices in graphical user interfaces and provide options to select such devices for connection. Further, some existing computing devices establish a connection with a remote device based on a signal strength of a wireless broadcast signal at a single time from a single device (with optional periodic updates) and a naming scheme for the single device. As auxiliary computing devices and their corresponding signals become highly concentrated in some environments, users can quickly or unwittingly select to connect with the wrong auxiliary computing device or automatically connect to the wrong auxiliary computing device based on a signal strength of a single device at a single time even with periodic signal updates.

In contrast to such conventional and existing computing devices, the disclosed provider client device can avoid such connection mistakes by automatically initiating a wireless network connection with an auxiliary computing device based on recurring detection of a wireless broadcast signal—and comparison to other wireless broadcast signals from other auxiliary computing devices using a signal-strength threshold—across time, locations, or application launches. By identifying a wireless broadcast signal and a corresponding auxiliary computing device based on a signal-strength threshold across time, locations, or application launches, the disclosed provider client device can more accurately initiate a wireless connection with a secure or intended auxiliary computing device—without the user errors fomented by conventional user interfaces of computing devices or errors of existing computing devices focused on the signal strength from a single device in a single time frame with optional periodic updates.

Beyond improved accuracy, in certain implementations, the disclosed provider client device improves the security with which a computing device connects (or pairs with) an auxiliary computing device. As just suggested, the provider client device avoids connecting with the wrong auxiliary computing device (including a device broadcasting a wireless broadcast signal mimicking a device identifier) by identifying a wireless broadcast signal and corresponding auxiliary computing device based on a signal-strength threshold across time, locations, or application launches. In some embodiments, the disclosed provider client device not only initiates but also terminates a wireless network connection (e.g., a pairing) based on detecting an elapsed time threshold, locations, or application functions. When temporarily connecting with an auxiliary computing device during a vehicle transport, for example, the provider client device optionally terminates a wireless connection with the auxiliary computing device based on a destination location or a selectable option to end a requested transportation in a transport applications.

As indicated by the foregoing description, this disclosure uses a variety of terms to describe features and advantages of a provider client device. As used in this disclosure, the term "wireless broadcast signal" refers to a signal transmitted by an auxiliary computing device to communicate a device identifier and/or other information for a computing device to use in establishing a wireless connection with the auxiliary computing device. In some embodiments, for example, a wireless broadcast signal refers to a Bluetooth broadcast signal transmitted by an auxiliary computing device, where the Bluetooth broadcast signal comprises any combination of a device identifier, a device name, and a device profile for the auxiliary computing device that nearby computing devices can use when initiating a wireless connection (e.g., forming a piconet with the auxiliary computing device). Such a Bluetooth broadcast signal may be a Classic Bluetooth signal or a Bluetooth Low Energy ("BLE") signal. As a further example, in certain implementations, a wireless broadcast signal refers to a Wi-Fi broadcast signal transmitted by an Internet router, a Wi-Fi access point, or other auxiliary computing device, where the Wi-Fi broadcast signal comprises one or both of a device identifier and a network name for the auxiliary computing device that nearby computing devices can use when initiating a wireless connection (e.g., to join a Wi-Fi network).

Relatedly, the term "device identifier" refers to an address or other identifier for a computing device. For example, in some embodiments, a device identifier comprises a series of digits or alphanumeric values identifying a computing device for a particular wireless protocol, such as a unique Bluetooth identifier or address. Alternatively, in certain cases, a device identifier comprises a series of digits or alphanumeric values identifying an Internet router or other computing device facilitating connection to a network, such as a service set identifier ("SSID") for a router.

As noted above, the disclosed provider client device can detect (and determine a strength of) a wireless broadcast signal at a given time period. The term "time period" refers to an instance or limited term or span of time. A time period may be a limited span of time measured in milliseconds, seconds, minutes, or some other unit of time measurement. Further, in some embodiments, a set interval of time may occur between a first time period and a second time period or between subsequent time periods. For instance, in some cases, the provider client device may detect (and determine a strength of) one or more wireless broadcast signals at a first time period and—a few milliseconds or seconds later— detect (and determine a strength of) one or more wireless broadcast signals at a second time period. Alternatively, a time period may correspond to a location of the provider client device. For example, in certain embodiments, the provider client device may detect (and determine a strength of) one or more wireless broadcast signals at a first time period corresponding to a first location of the provider client device and—after the provider client device has traveled a threshold distance—detect (and determine a strength of) one or more wireless broadcast signals at a second time period corresponding to a second location of the provider client device.

As further suggested above, the term "auxiliary computing device" refers to a computing device that can perform a computing function based on a wireless connection with another computing device. In some cases, an auxiliary computing device transmits a wireless broadcast signal to a establish a wireless connection with a client device to perform computing functions at the request (or on behalf) of the client device. For example, in some embodiments, an auxiliary computing device refers to an in-vehicle-display device that (i) transmits a Bluetooth broadcast signal to establish a wireless connection with a client device and (ii) communicates messages for a transportation matching system based on requests from the client device. By contrast, in some instances, an auxiliary computing device refers to a wireless camera, a wireless video camera, a wireless speaker, a wireless video monitor that transmits a Bluetooth broadcast signal and (upon connecting with a client device) captures images or generates audio based on requests or commands from the client device. As a further example, an auxiliary computing device sometimes refers to a network router or mobile device that transmits a Wi-Fi broadcast signal and (upon connecting with a client device) connects or routes the client device to a network.

Relatedly, the term "in-vehicle-display device" refers to a computing device in a vehicle comprising a digital display for communicating any combination of graphics, messages, colors, or patterns. In some embodiments, for instance, an in-vehicle-display device comprises a digital display for presenting a graphic or a message identifying a vehicle for a requestor of transportation for a transportation matching system. In certain implementations, the in-vehicle-display device can present a graphic, message, color, or pattern identifying a vehicle based on data sent from a provider client device operated by a provider for the vehicle. Further, an in-vehicle-display device optionally presents such graphics, messages, colors, or patterns in a user interface based on interactions with a requestor or provider (e.g., user selection of buttons or instructions from a client device).

As noted above, a provider client device can initiate a wireless connection with an auxiliary computing device based on determining that a wireless broadcast signal from the auxiliary computing device satisfies a signal-strength threshold. The term "signal-strength threshold" refers to a comparative threshold or a quantitative threshold for a wireless broadcast signal. In some embodiments, for instance, a signal-strength threshold refers to a comparative threshold identifying a particular wireless broadcast signal as the strongest wireless broadcast signal within a detection range. Such a comparative threshold includes identifying a single and only wireless broadcast signal or the only wireless broadcast signal corresponding to a particular type of auxiliary computing device within a detection range. Alternatively, a comparative threshold includes identifying a strongest wireless broadcast signal among multiple wireless broadcast signals within the detection range (e.g., as measured by power or by decibels). When a provider client device detects a single wireless broadcast signal within a detection range, for instance, the provider client device optionally identifies this single wireless broadcast signal as satisfying a comparative signal-strength threshold. By contrast, in some embodiments, a signal-strength threshold refers to a quantitative threshold identifying a measurement of power, decibels, or other quantitative value that a wireless broadcast signal must equal or exceed to satisfy a quantitative signal-strength threshold.

As suggested above, a provider client device can initiate different types of wireless network connections. The term "wireless network connection" refers to a wireless connection between computing devices that forms (or joins) a network, including a personal area network or a local area network. For example, in some embodiments, a wireless network connection refers to a pairing between a computing device and an auxiliary computing device to form a personal area network (or piconet) based on Bluetooth protocol (e.g., Classic Bluetooth or BLE). Such a pairing can be made between any Bluetooth-enabled devices, such as provider client devices, in-vehicle-display devices, wireless cameras, wireless video cameras, wireless speakers, and wireless video monitors. By contrast, in certain implementations, a wireless network connection refers to an initial connection between a computing device (e.g., a client device) and an auxiliary computing device (e.g., a router) as part of a local area network.

As suggested above, the term "provider" refers to a driver or other person who operates a transportation vehicle and/or who interacts with a provider client device. For instance, a provider includes a person who drives a transportation vehicle along various routes to pick up and drop off requestors of transportation. Relatedly, the term "provider client device" refers to a computing device associated with (or used by) a provider or a transportation vehicle. In some embodiments, a provider client device includes a provider transport application comprising instructions that (upon execution) cause the provider client device to perform various actions for a transportation matching system, as described herein.

By contrast, the term "requestor" refers to person who requests a ride or other form of transportation from a transportation matching system. A requestor may refer to a person who requests a ride or other form of transportation but who is still waiting for pickup. A requestor may also refer to a person whom a transportation vehicle has picked up and who is currently riding within the transportation vehicle to a destination (e.g., a destination indicated by a requestor). Relatedly, the term "requestor client device" refers to a computing device associated with (or used by) a requestor. In some embodiments, a requestor client device includes a requestor transport application comprising instructions that (upon execution) cause the requestor client device to perform various actions for a transportation matching system, as described herein.

Turning now to the figures, FIG. 1 illustrates a schematic diagram of an environment 100 for implementing a transportation matching system 104 in accordance with one or more embodiments. As shown in FIG. 1, the environment 100 includes server(s) 102 comprising the transportation matching system 104, transportation vehicles 108a-108n, provider client devices 112a-112n respectively corresponding to the transportation vehicles 108a-108n, requestor client devices 118a-118n respectively corresponding to requestors 116a-116n, and a network 106. In some embodiments, the transportation vehicles 108a-108n include one or both of providers 110a-110n and in-vehicle-display devices 114a-114n, respectively, where the in-vehicle-display devices 114a-114n communicate messages for the transportation matching system 104.

The transportation matching system 104 uses the server(s) 102 to communicate with one or both of the provider client devices 112a-112n and the requestor client devices 118a-118n via the network 106. For example, the transportation matching system 104 communicates with the provider client devices 112a-112n and the requestor client devices 118a-118n via the network 106 to determine locations of the provider client devices 112a-112n and the requestor client devices 118a-118n, respectively. Per device settings, for instance, the transportation matching system 104 may receive location coordinates from the provider client devices 112a-112n and/or the requestor client device 118a-118n, respectively. Based on the location coordinates, the transportation matching system 104 matches or assigns one or more of the transportation vehicles 108a-108n with or to one or more of the requestors 116a-116n for transportation.

As suggested above, each of the provider client devices 112a-112n and the requestor client devices 118a-118n may comprise a mobile device, such as a laptop, smartphone, or tablet associated with a requestor or a provider. The provider client devices 112a-112n or the requestor client devices 118a-118n may be any type of computing device as further explained below with reference to FIG. 8. In some embodiments, one or more of the provider client devices 112a-112n are not associated with providers, but are attached to (or integrated within) the transportation vehicles 108a-108n, respectively.

As further indicated by FIG. 1, each of the provider client devices 112a-112n include a provider transport application. Similarly, each of the requestor client devices 118a-118n include a requestor transport application. In some embodiments, the provider transport applications (or the requestor transport applications) comprise web browsers, applets, or other software applications (e.g., native applications) available to the provider client devices 112a-112n or the requestor client devices 118a-118n, respectively. Additionally, in some instances, the transportation matching system 104 provides data including instructions that, when executed by the provider client devices 112a-112n or by the requestor client devices 118a-118n, respectively create or otherwise integrate provider transport applications or requestor transport applications within an application or webpage.

As depicted in FIG. 1, a requestor may use a requestor transport application to request transportation services, receive a price estimate for the transportation service, and access other transportation-related services. For example, the requestor 116a may interact with the requestor client device 118a through graphical user interfaces of a requestor transport application to enter a pickup location and a destination for transportation. The transportation matching system 104 can in turn provide the requestor client device 118a with a price estimate for the transportation and an estimated time of arrival of a provider (or transportation vehicle) through the requestor transport application. Having received the price estimate, the requestor 116a may then select (and the requestor client device 118a detect) a selection of a transportation-request option to request transportation services from the transportation matching system 104.

As further depicted in FIG. 1, the transportation matching system 104 sends requests from one or more of the requestor client devices 118a-118n to one or more of the provider client devices 112a-112n within the transportation vehicles 108a-108n, respectively. While FIG. 1 depicts the transportation vehicles 108a-108n as automobiles, a transportation vehicle may also be an airplane, bicycle, motorcycle, scooter, or other vehicle. In some cases, this disclosure describes a transportation vehicle as performing certain functions, but such a transportation vehicle includes an associated provider client device that often performs a corresponding function. For example, when the transportation matching system 104 sends a transportation request to the transportation vehicle 108a—or queries location information from the transportation vehicle 108a—the transportation matching system 104 sends the transportation request or location query to the provider client device 112a. Accordingly, the transportation vehicle 108a and the provider client device 112a are part of a vehicle subsystem.

Although not illustrated in FIG. 1, in some embodiments, the environment 100 may have a different arrangement of components and/or may have a different number or set of components altogether. In certain implementations, for instance, some or all of the transportation vehicles 108a-108n do not include a provider, but include autonomous transportation vehicles—that is, a self-driving vehicle that includes computer components and accompanying sensors for driving without manual-provider input from a human operator. As a further example, in some embodiments, one or more of the transportation vehicles 108a-108n include a hybrid self-driving vehicle with both self-driving functionality and some human operator interaction.

When a transportation vehicle is an autonomous vehicle or a hybrid self-driving vehicle, the transportation vehicle may include additional components not depicted in FIG. 1. Such components may include location components, one or more sensors by which the autonomous vehicle navigates, and/or other components necessary to navigate without a provider (or with minimal interactions with a provider). Regardless of whether a transportation vehicle is associated with a provider, a transportation vehicle optionally includes a locator device, such as a GPS device, that determines the location of the transportation vehicle within the transportation vehicles 108a-108n.

As mentioned above, the transportation vehicles 108a-108n respectively include provider client devices 112a-112n separate or integral to the transportation vehicles 108a-108n. Additionally, or alternatively, the provider client device 112a may be a subcomponent of a vehicle computing system. Regardless of its form, the provider client devices 112a-112n may include various sensors, such as a GPS locator, an inertial measurement unit, an accelerometer, a gyroscope, a magnetometer, and/or other sensors, from which the transportation matching system 104 can access information, such as location information.

In some embodiments, the transportation matching system 104 communicates with the provider client devices 112a-112n through their respective provider transport applications. For instance, a provider transport application can cause the provider client device 112a to communicate with the transportation matching system 104 to navigate to a pickup location to pick up a requestor, navigate to a destination location, and/or collect fares. As suggested above, in some embodiments, provider transport applications include computer-executable instructions that (upon execution) cause one or more of the provider client devices 112a-112n to initiate a wireless network connection with an auxiliary computing devices, such as a wireless connection with one or more of the in-vehicle-display devices 114a-114n or wireless cameras, wireless video cameras, or wireless speakers.

As shown in FIG. 1, for instance, the provider client device 112a detects wireless broadcast signals from the in-vehicle-display devices 114a-114n at an initial time period. Each such wireless broadcast signal comprises a particular device identifier for one of the in-vehicle-display devices 114a-114n. The provider client device 112a further determines that a wireless broadcast signal from the in-vehicle-display device 114a satisfies a signal-strength threshold at the initial time period, where the wireless broadcast signal comprises a device identifier for the in-vehicle-display device 114a.

After the initial time period, the provider client device 112a again detects the wireless broadcast signal from the in-vehicle-display device 114a and determines that the wireless broadcast signal satisfies the signal-strength threshold at a subsequent time period. Based on determining that the wireless broadcast signal from the in-vehicle-display device 114a satisfies the signal-strength threshold at the initial and subsequent (and sometimes additional) time periods, the provider client device 112a initiates a wireless network connection between the provider client device 112a and the in-vehicle-display device 114a. Upon establishing the wireless network connection, the in-vehicle-display device 114a can present a graphic, message, color, or pattern identifying the transportation vehicle 108a for a matched requestor from the requestors 116a-116n.

Figure 2:
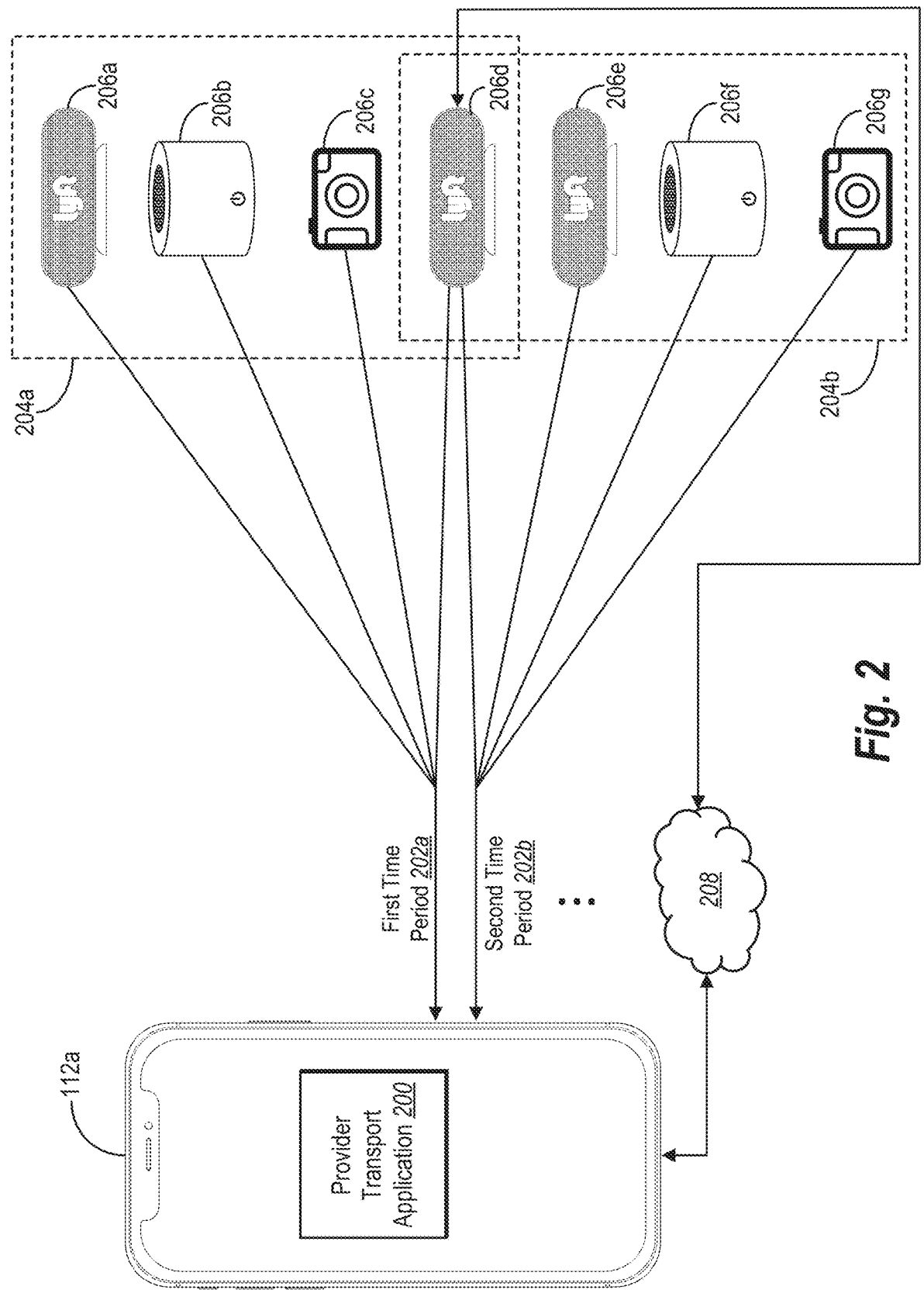
FIG. 2 illustrates a provider client device automatically initiating a wireless network connection with an auxiliary computing device from among multiple auxiliary computing devices based on recurring detection of a wireless broadcast signal from the auxiliary computing device in accordance with one or more embodiments.

FIG. 2 illustrates an example of the provider client device 112a automatically initiating a wireless network connection 208 with an auxiliary computing device 206d based on recurring detection of a wireless broadcast signal from the auxiliary computing device 206d. At a first time period 202a shown in FIG. 2, the provider client device 112a determines that a wireless broadcast signal from the auxiliary computing device 206d (within a first group of devices) satisfies a signal-strength threshold. At a second time period 202b, the provider client device 112a again determines that the wireless broadcast signal from the auxiliary computing device 206d (within a second group of devices) satisfies the signal-strength threshold. Based on the wireless broadcast signal from the auxiliary computing device 206d satisfying the signal-strength threshold at multiple time periods, the provider client device 112a initiates the wireless network connection 208 with the auxiliary computing device 206d.

As shown in FIG. 2, the provider client device 112a includes a provider transport application 200. The provider transport application 200 comprises computer-executable instructions to perform certain actions for the transportation matching system 104. For example, the provider transport application 200 optionally comprises instructions that (upon execution) cause the provider client device 112a to present selectable options within a graphical user interface to establish a wireless network connection with an auxiliary computing device selected by the provider 110a. Additionally, or alternatively, the provider transport application 200 comprises instructions that (upon execution) cause the provider client device 112a to automatically initiate a wireless network connection with an auxiliary computing device as depicted in FIG. 2. While the provider client device 112a performs actions in this disclosure based on computer-executable instructions from the provider transport application 200, this disclosure generally describes the provider client device 112a as performing such actions for simplicity.

As further shown at the first time period 202a in FIG. 2, the provider client device 112a detects a wireless broadcast signal from each auxiliary computing device in a first group of auxiliary computing devices 204a (e.g., a Bluetooth broadcast signal or a Wi-Fi broadcast signal). In this example, the first group of auxiliary computing devices 204a includes auxiliary computing devices 206a-206d. Each wireless broadcast signal from an auxiliary computing device comprises a device identifier corresponding to a specific auxiliary computing device from the auxiliary computing devices 206a-206d. In some cases, the device identifier includes digits, alphanumeric values, or other values identifying a type of auxiliary computing device. While the first group of auxiliary computing devices 204a includes various types of auxiliary computing devices—including in-vehicle-display devices, wireless speakers, and wireless cameras—the first group of auxiliary computing devices 204a could include any combination of auxiliary computing devices.

Alternatively, in certain implementations at the first time period 202a, the provider client device 112a scans for (and detects) wireless broadcast signals from a same type of auxiliary computing device. To detect such auxiliary computing devices, in some embodiments, each auxiliary computing device within a group of auxiliary computing devices transmits one or more of a device identifier, a device name, or a device profile identifying the specific type of auxiliary computing device. Accordingly, in some cases, each auxiliary computing device within the first group of auxiliary computing devices 204a is an in-vehicle-display device, a wireless speaker, or some other same type of auxiliary computing device. Accordingly, at the second time period 202b or any subsequent time period, the provider client device 112a may likewise scan for (and detect) wireless broadcast signals from a group of auxiliary computing devices of the same type.

As further indicated at the first time period 202a in FIG. 2, the provider client device 112a determines that a wireless broadcast signal from the auxiliary computing device 206d (from among the first group of auxiliary computing devices 204a) satisfies a signal-strength threshold. For example, the provider client device 112a may determine that a wireless broadcast signal from the auxiliary computing device 206d constitutes the strongest wireless broadcast signal from among wireless broadcast signals transmitted by the first group of auxiliary computing devices 204a. Alternatively, the provider client device 112a may determine that the wireless broadcast signal from the auxiliary computing device 206d equals or exceeds a quantitative signal strength (e.g., in watts or decibels).

As further shown at the second time period 202b in FIG. 2, the provider client device 112a detects a wireless broadcast signal from each auxiliary computing device in a second group of auxiliary computing devices 204b. In particular, the second group of auxiliary computing devices 204b includes auxiliary computing devices 206d-206g. Each wireless broadcast signal from an auxiliary computing device comprises a device identifier corresponding to a specific auxiliary computing device from the auxiliary computing devices 206d-206g.

As in the first group of auxiliary computing devices 204a, the second group of auxiliary computing devices 204b may include different types of auxiliary computing devices or a same type of auxiliary computing device. While FIG. 2 depicts the second group of auxiliary computing devices 204b as including in-vehicle-display devices, a wireless speaker, and a wireless camera, in additional embodiments, the second group of auxiliary computing devices 204b could include any combination of auxiliary computing devices. Further, in some embodiments, the provider client device 112a detects similar or the same wireless broadcast signals from a group of auxiliary computing devices at the first time period 202a and the second time period 202b, where the first group of auxiliary computing devices 204a and the second group of auxiliary computing devices 204b comprise the same (or an overlapping set of) auxiliary computing devices.

As further shown at the second time period 202b in FIG. 2, the provider client device 112a determines that the wireless broadcast signal from the auxiliary computing device 206d (from among the second group of auxiliary computing devices 204b) satisfies a signal-strength threshold. For example, the provider client device 112a may determine that a wireless broadcast signal from the auxiliary computing device 206d constitutes the strongest wireless broadcast signal from among wireless broadcast signals transmitted by the second group of auxiliary computing devices 204b (e.g., as measured in watts or decibels). For purposes of simplicity, FIG. 2 illustrates merely the first time period 202a and the second time period 202b. In alternative embodiments, however, the provider client device 112a detects and determines that the wireless broadcast signal from the auxiliary computing device 206d satisfies the signal-strength threshold at additional time periods.

Based on determining that the wireless broadcast signal from the auxiliary computing device 206d satisfies the signal-strength threshold at the first time period 202a and the second time period 202b (and sometimes at additional time periods), the provider client device 112a automatically initiates the wireless network connection 208 between the provider client device 112a and the auxiliary computing device 206d. For example, in some embodiments, the provider client device 112a initiates the wireless network connection 208 by following a Bluetooth protocol to pair the provider client device 112a with the auxiliary computing device 206d. As a further example, in certain implementations, the provider client device 112a initiates the wireless network connection 208 by following a Wi-Fi protocol to initially connect the provider client device 112a with the auxiliary computing device 206d.

Figure 3A:
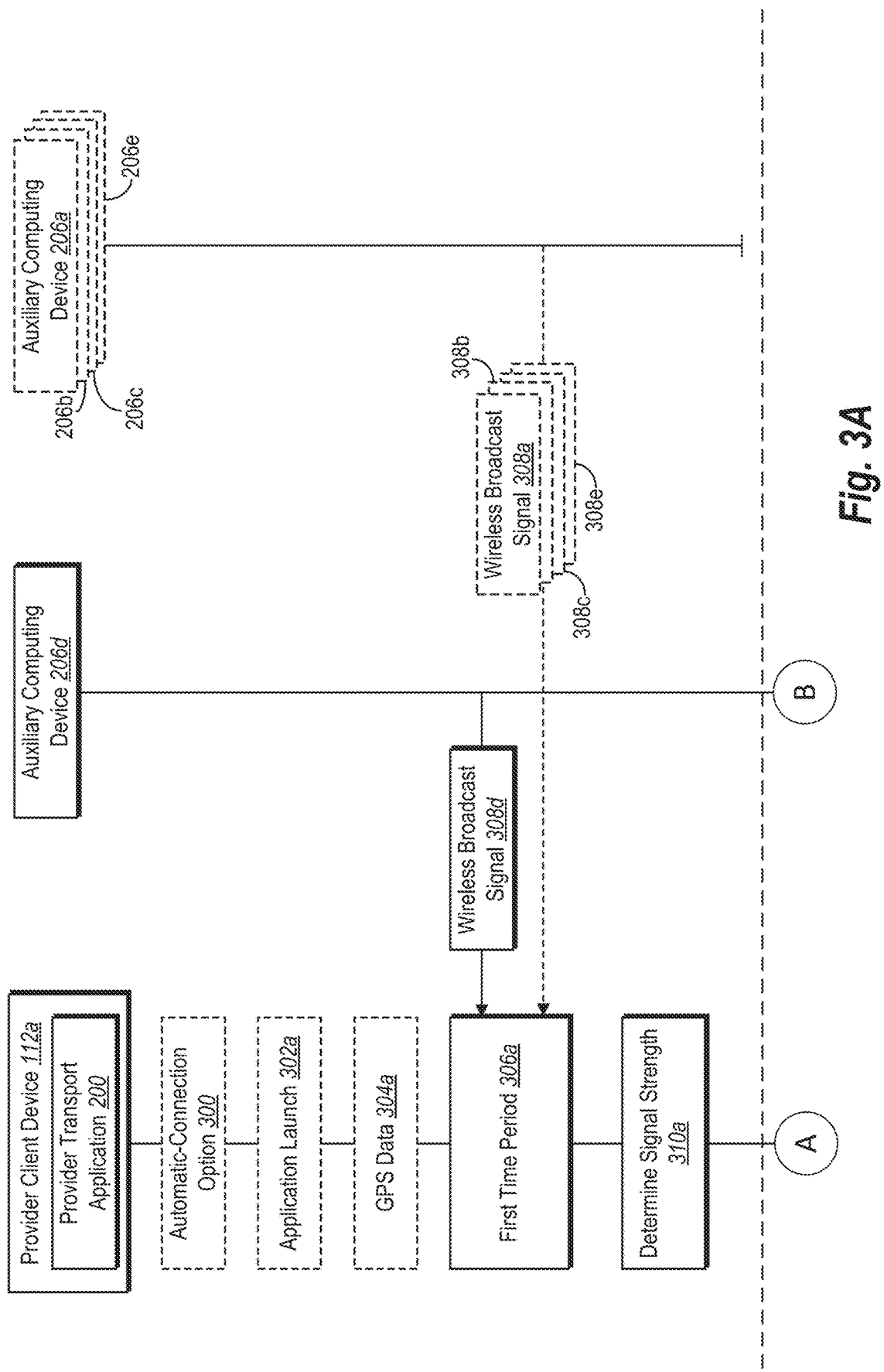
Figure 3B:
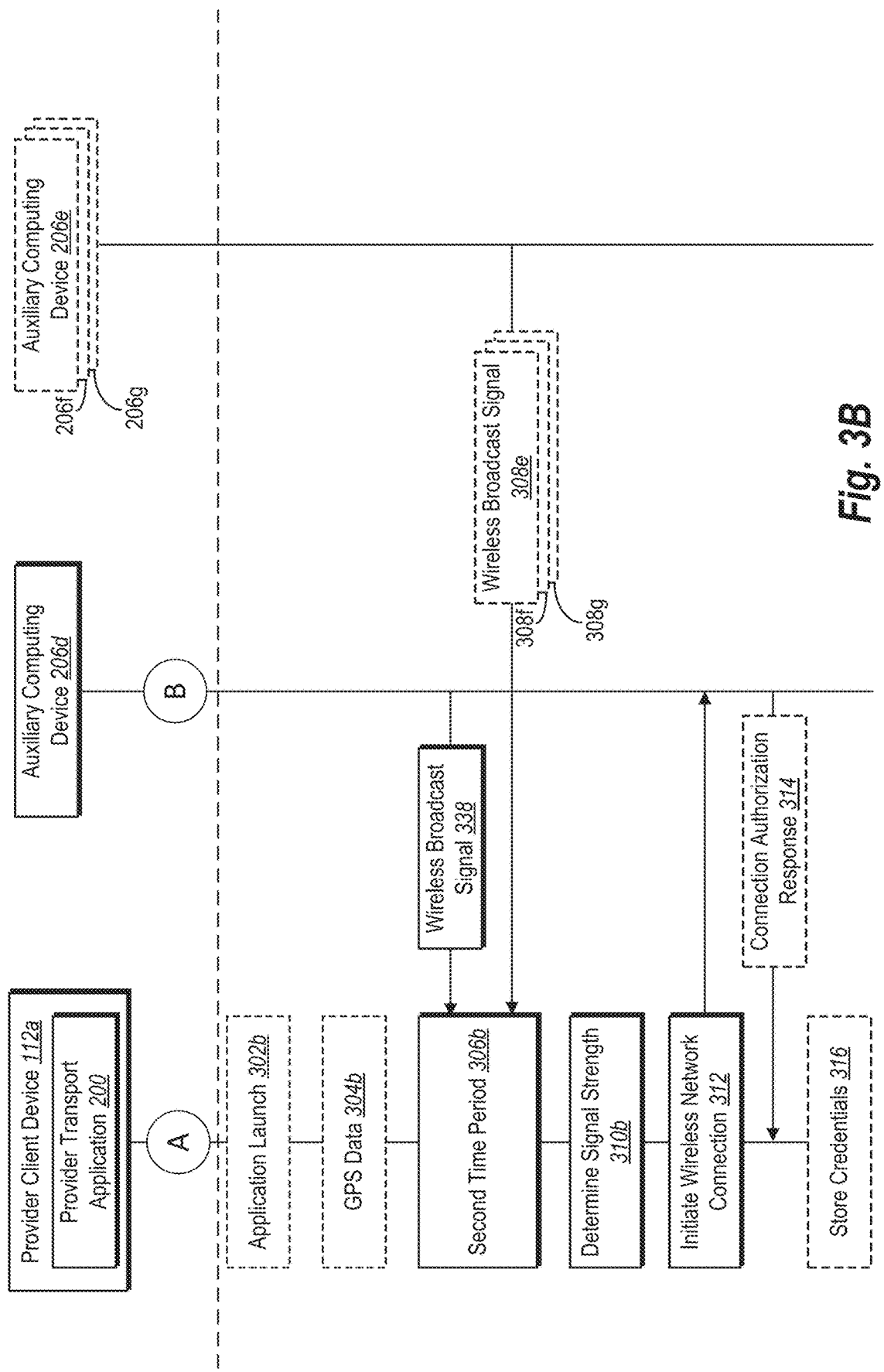

Turning now to FIGS. 3A-3C, these figures illustrate sequence-flow diagrams of the provider client device 112a automatically initiating a wireless network connection with the auxiliary computing device 206d based on recurring detection of a corresponding wireless broadcast signal 308d across time periods. As indicated by FIGS. 3A-3B, the provider client device 112a optionally detects wireless broadcast signals from auxiliary computing devices at multiple time periods based on various triggers, such as application launches by or locations of the provider client device 112a. Based on computer-executable instructions from the provider transport application 200, the provider client device 112a performs the actions depicted in FIGS. 3A-3B, such as detecting and determining a strength of wireless broadcast signals and initiating a wireless network connection with the auxiliary computing device 206d. FIG. 3C illustrates some optional features for the provider client device 112a.

As suggested above, the provider client device 112a optionally detects wireless broadcast signals across time periods based on one or both of selectable options and triggers. In some embodiments, for example, the provider client device 112a presents within a graphical user interface (and detects a selection by the provider 110a of) an automatic-connection option 300. The provider client device 112a may present the automatic-connection option 300 in a notification or in a graphical user interface of the provider transport application 200, a preferences application, or a settings application. By detecting a selection of the automatic-connection option 300, the provider client device 112a receives authorization or permission from the provider 110a to automatically initiate a wireless network connection with an auxiliary computing device selected by the provider client device 112a. By contrast, in certain implementations, the provider client device 112a can automatically initiate a wireless network connection without user authorization or permission (e.g., when the provider client device 112a is part of a self-driving vehicle).

As further shown in FIG. 3A, the provider client device 112a optionally detects one or more wireless broadcast signals at the first time period 306a based on an application launch 302a. In other words, the application launch 302a can trigger the provider client device 112a to detect wireless broadcast signals at the first time period 306a. For example, in some embodiments, the provider client device 112a detects wireless broadcast signals at the first time period 306a based on the provider client device 112a launching the provider transport application 200. By contrast, the application launch 302a may entail the provider client device 112a launching a different application, such as a mapping software application or a routing software application.

In some cases, the application launch 302a initiates an application session in which the provider client device 112a detects user selection of the automatic-connection option 300 (as described above). In other cases, the application launch 302a initiates a subsequent session after the provider client device 112a detects user selection of the automatic-connection option 300. As suggested above, in certain implementations, the provider client device 112a detects wireless broadcast signals based on the application launch 302a independent of any specific user selection of the automatic-connection option 300.

Additionally, or alternatively, the provider client device 112a optionally detects one or more wireless broadcast signals at the first time period 306a when the provider client device 112a is located at a first location. As indicated by FIG. 3A, for instance, the provider client device 112a detects GPS data 304a indicating a first location at the first time period 306a. The provider client device 112a can use a GPS receiver, for example, to detect or receive any such GPS data as longitudinal and latitudinal coordinates or degrees. In addition to detecting the GPS data 304a, the provider client device 112a detects wireless broadcast signals at the first time period 306a—by detecting signals when the provider client device 112a is located at the first location indicated by the GPS data 304a.

As further shown at the first time period 306a in FIG. 3A, the provider client device 112a detects the wireless broadcast signal 308d from the auxiliary computing device 206d. In some such embodiments, the provider client device 112a detects the wireless broadcast signal 308d alone (or the wireless broadcast signal 308d as the only signal from a particular type of auxiliary computing device) at a given time period. In some cases, however, the provider client device 112a also detects wireless broadcast signals 308a-308c and 308e respectively from the auxiliary computing devices 206a-206c and 206e at the first time period 306a. As indicated by one or more of a device identifier, a device name, or a device profile in each of the wireless broadcast signals 308a-308e, the auxiliary computing devices 206a-206e may include different types of auxiliary computing devices or a same type of auxiliary computing device.

After detecting the wireless broadcast signal 308d at the first time period 306a, the provider client device 112a further determines signal strength 310a for one or both of the wireless broadcast signal 308d and the wireless broadcast signals 308a-308c and 308e. When determining the signal strength 310a, the provider client device 112a also determines whether one or both of the wireless broadcast signal 308d and the wireless broadcast signals 308a-308c and 308e satisfy a signal-strength threshold (e.g., a comparative or a quantitative signal-strength threshold). When the wireless broadcast signal 308d comprises the only detected signal (or the only detected signal from a particular type of auxiliary computing device) at the first time period 306a, for instance, the provider client device 112a determines that the wireless broadcast signal 308d satisfies the signal-strength threshold.

By contrast, in some cases, the provider client device 112a may determine that the wireless broadcast signal 308d constitutes the strongest wireless broadcast signal from among the wireless broadcast signals 308a-308e. For instance, the provider client device 112a may rank the wireless broadcast signals 308a-308e according to wireless signal strength and determine that the wireless broadcast signal 308d corresponds to a highest ranked wireless broadcast signal from among the wireless broadcast signals 308a-308e. Additionally, or alternatively, the provider client device 112a may determine that the wireless broadcast signal 308d equals or exceeds a quantitative signal strength (e.g., measured in watts or decibels).

Turning back now to FIG. 3B, this figure illustrates the provider client device 112a at the second time period 306b again detecting wireless broadcast signal(s) from auxiliary computing device(s) and initiating a wireless networking connection with the auxiliary computing device 206d. As shown in FIG. 3B, the provider client device 112a optionally detects wireless broadcast signals at the second time period 306b based on one or more triggers, such as a subsequent application launching or a subsequent location of the provider client device 112a. For instance, in certain implementations, the provider client device 112a detects wireless broadcast signals at the second time period 306b based on an application launch 302b, such as the provider client device 112a again launching the provider transport application 200. In some cases, the application launch 302b represents a subsequent launching of the provider transport application 200 to report a pickup or a requestor or a drop off of a requestor.

As further shown in FIG. 3B, the provider client device 112a detects GPS data 304b indicating a second location at the second time period 306b. Based on the GPS data 304b, the provider client device 112a determines that it has traveled (or is located at) a second location that is a threshold distance from the first location indicated by the GPS data 304a. Such a threshold distance could constitute a few meters, several feet, a kilometer, or any distance from an initial location. In some cases, the threshold distance indicates that the transportation vehicle 108a has traveled from the first location to the second location. Based on detecting the GPS data 304b and determining that the provider client device 112a is located a threshold distance from the first location, the provider client device 112a scans and detects wireless broadcast signals at the second time period 306b.

As further shown at the second time period 306b in FIG. 3B, the provider client device 112a again detects the wireless broadcast signal 308d from the auxiliary computing device 206d. The provider client device 112a also optionally detects wireless broadcast signals 308e-308g respectively from the auxiliary computing devices 206e-206g at the second time period 306b. As indicated by one or more of a device identifier, a device name, or a device profile in each of the wireless broadcast signals 308d-308g, the auxiliary computing devices 206d-206g may include different types of auxiliary computing devices or a same type of auxiliary computing device.

After again detecting the wireless broadcast signal 308d at the second time period 306b, the provider client device 112a further determines signal strength 310b for one or both of the wireless broadcast signal 308d and the wireless broadcast signals 308e-308g. When determining the signal strength 310b, the provider client device 112a determines that the wireless broadcast signal 308d constitutes the strongest wireless broadcast signal—as the only wireless broadcast signal or as the strongest wireless broadcast signal from among the wireless broadcast signals 308d-308g at the second time period 306b. Additionally, or alternatively, the provider client device 112a determines that the wireless broadcast signal 308d equals or exceeds a quantitative signal strength (e.g., in watts or decibels) at the second time period 306b.

As suggested above, the provider client device 112a compares the wireless broadcast signal 308d to a signal-strength threshold at both the first time period 306a and the second time period 306b. In some embodiments, the signal-strength threshold at the first time period 306a and the second time period 306b are the same. By contrast, in certain embodiments, a signal-strength threshold at the first time period 306a differs from a signal-strength threshold at the second time period 306b. For example, a signal-strength threshold may constitute a first quantitative signal strength at a first location based on GPS data for the first time period 306b, but constitute a second quantitative signal strength at a second location based on GPS data at a second location. As explained below with reference to FIGS. 5A-5B, signal-strength thresholds may likewise differ (and be specific to) computing device type.

Based on determining that the wireless broadcast signal 308d from the auxiliary computing device 206d satisfies the signal-strength threshold at the first time period 306a and the second time period 306b (and sometimes at additional time periods), the provider client device 112a automatically initiates a wireless network connection 312 between the provider client device 112a and the auxiliary computing device 206d. For example, in some embodiments, the provider client device 112a initiates the wireless network connection 312 by sending a Bluetooth pairing request to the auxiliary computing device 206d in accordance with a Bluetooth protocol. As a further example, in certain implementations, the provider client device 112a initiates the wireless network connection 312 by sending a Wi-Fi network access request in accordance with a Wi-Fi protocol.

Upon receiving a request to initiate the wireless network connection 312, in some embodiments, the auxiliary computing device 206d transmits (and the provider client device 112a receives) a connection authorization response 314. The connection authorization response 314 follows a wireless connection protocol to form the wireless network connection 312 between the provider client device 112a and the auxiliary computing device 206d. For example, in some embodiments, the auxiliary computing device 206b sends (and the provider client device 112a receives) a Bluetooth passkey or pairing code to form the wireless network connection 312. As a further example, in certain implementations, the auxiliary computing device 206b sends (and the provider client device 112a receives) a Wi-Fi passkey or code to form the wireless network connection 312.

As further shown in FIG. 3B, in certain implementations, the provider client device 112a stores credentials 316 of the auxiliary computing device 206d based on forming the wireless network connection 312. For instance, the provider client device 112a may store one or more of a device identifier, a device name, a device profile, or a passkey or code in a non-transitory-computer-readable storage for future wireless connection. By storing the credentials 316, the provider client device 112a can scan for (and automatically connect with) the auxiliary computing device 206d at subsequent time periods.

As noted above, the provider client device 112a can not only initiate wireless network connections, but can optionally terminate wireless network connections based on various triggers. As shown in FIG. 3C, for instance, the provider client device 112a optionally transmits a disconnection signal 318 to the auxiliary computing device 206d to terminate the wireless network connection 312. Alternatively, the provider client device 112a disconnects the wireless network connection 312 without sending a specific signal. The provider client device 112a may transmit the disconnection signal 318 (or otherwise disconnect the wireless network connection 312) based on detecting an elapsed time threshold, locations, or application functions. In some such cases, the provider client device 112a transmits the disconnection signal 318 (or otherwise disconnects the wireless network connection 312) after a threshold time has elapsed from detecting an initial time period, a location indicated by GPS data, or an application function (e.g., an option selected by the provider 110a to identify pick up of a requestor for transportation).

For instance, in some embodiments, the provider client device 112a transmits the disconnection signal 318 (or otherwise disconnects the wireless network connection 312) based on determining that the provider client device 112a is located at a particular location indicated by GPS data, such as a destination location selected by a requestor. Alternatively, the provider client device 112a transmits the disconnection signal 318 (or otherwise disconnects the wireless network connection 312) based on detecting a selection by the provider 110a of a selectable option to conclude a transportation, such as by detecting a selection of a drop-off option within a graphical user interface of the provider transport application 200.

As further indicated by FIG. 3C, the provider client device 112a optionally initiates a wireless network connection with an alternative auxiliary computing device when an initially targeted auxiliary computing device is unavailable for connection. In particular, the provider client device 112a optionally determines an auxiliary computing device (e.g., auxiliary computing device 206d) is unavailable for connection 320. When initiating the wireless network connection 312 with the auxiliary computing device 206d, for instance, the provider client device 112a may not receive the connection authorization response 314 or otherwise not receive data following a wireless connection protocol necessary to form a connection. In some such cases, the auxiliary computing device 206d may be locked from connecting (e.g., pairing) with additional client devices or may have ceased transmitting wireless signals to form a wireless network connection according to a wireless connection protocol.

Based in part on determining that an auxiliary computing device is unavailable for connection 320, the provider client device 112a optionally initiates an alternative wireless network connection 322. As shown in FIG. 3C, for instance, the provider client device 112a optionally initiates the alternative wireless network connection 322 with the auxiliary computing device 206e. The provider client device 112a initiates the alternative wireless network connection 322 with the auxiliary computing device 206e based in part on recurring detection of the wireless broadcast signal 308e and its signal strength.

In some embodiments, for instance, the provider client device 112a determines that the wireless broadcast signal 308e from the auxiliary computing device 206e constitutes a next strongest wireless broadcast signal from among the wireless broadcast signals ranked at the first time period 306a and at the second time period 306b. Alternatively, the provider client device 112a detects and determines that the wireless broadcast signal 308e from the auxiliary computing device 206e satisfies the signal-strength threshold at subsequent time periods. Based on determining that the wireless broadcast signal 308e constitutes the next strongest wireless broadcast signal at the first time period 306a and the second time period 306b—or that the wireless broadcast signal 308e satisfies the signal-strength threshold at subsequent time periods—the provider client device 112a initiates the alternative wireless network connection 322 with the auxiliary computing device 206e when the auxiliary computing device 206d is unavailable for connection.

In addition (or in the alternative to) automatically initiating a wireless network connection with an auxiliary computing device based on recurring detection of a wireless broadcast signal, the provider client device 112a optionally uses a machine learner to identify an auxiliary computing device with which to initiate a connection. For example, in certain implementations, the transportation matching system 104 trains a machine learner to identify a target auxiliary computing device using wireless broadcast signals detected by a provider client device, signal strengths for such signals, and wireless network connections that a provider client device maintained (and reconnected with) for a threshold time period. Based on such historical wireless broadcast signals and maintained connections, the transportation matching system 104 trains the machine learner to identify an auxiliary computing device from a group of auxiliary computing devices most likely to sustain a wireless network connection for the threshold time period. The transportation matching system 104 can then implement the trained machine learner on the server(s) 102 for the provider client device 112a or include an instance of the trained machine learner within the provider transport application 200.

In addition to automatically initiating a wireless network connection, in certain embodiments, the provider client device 112a can again connect to an auxiliary computing device based on user interactions with options within the provider transport application 200. For example, in some cases, the provider client device 112a detects a user interaction by the provider 110a accepting a transportation request from the transportation matching system 104 to transport a requestor to a destination location. Such user interaction may include the provider client device 112a detecting a selection of request-acceptance option within a graphical user interface of the provider transport application 200. The provider client device 112a subsequently detects the wireless broadcast signal 308d from among a group of wireless broadcast signals. Based on the stored credentials 316, the provider client device 112a connects with the auxiliary computing device 206d for a duration of transportation corresponding to the accepted transportation request. In some such embodiments, for example, the provider client device 112a connects with a wireless camera for a duration of the transportation and terminates the connection based on the provider 110a selecting a drop-off option within a graphical user interface of the provider transport application 200.

This disclosure describes the provider client device 112a as performing various functions in FIG. 2 and FIGS. 3A-3C. In some embodiments, however, a requestor client device can perform the same or similar functions performed by the provider client device 112a in FIG. 2 and FIGS. 3A-3C, except that such a requestor client device launches, executes, and detects selections within a graphical user interface for a requestor transport application.

Conversely, in some embodiments, an auxiliary computing device performs the various functions in FIG. 2 and FIGS. 3A-3C, except that the auxiliary computing device detects wireless broadcast signals from and initiates a wireless network connection with a client device. For example, in certain implementations, an auxiliary computing device detects a wireless broadcast signal (e.g., among multiple wireless broadcast signals) at a first time period, where the wireless broadcast signal comprises a device identifier for a client device. The auxiliary computing device further determines that the wireless broadcast signal from the client device satisfies a signal-strength threshold at the first time period. After the first time period, the auxiliary computing device again detects the wireless broadcast signal from the client device (e.g., among multiple wireless broadcast signals) and determines that the wireless broadcast signal satisfies the signal-strength threshold at a second time period. Based on determining that the wireless broadcast signal from the client device satisfies the signal-strength threshold at the first and second (and sometimes additional) time periods, the auxiliary computing device initiates a wireless network connection between the auxiliary computing device and the client device.

Figure 4A:
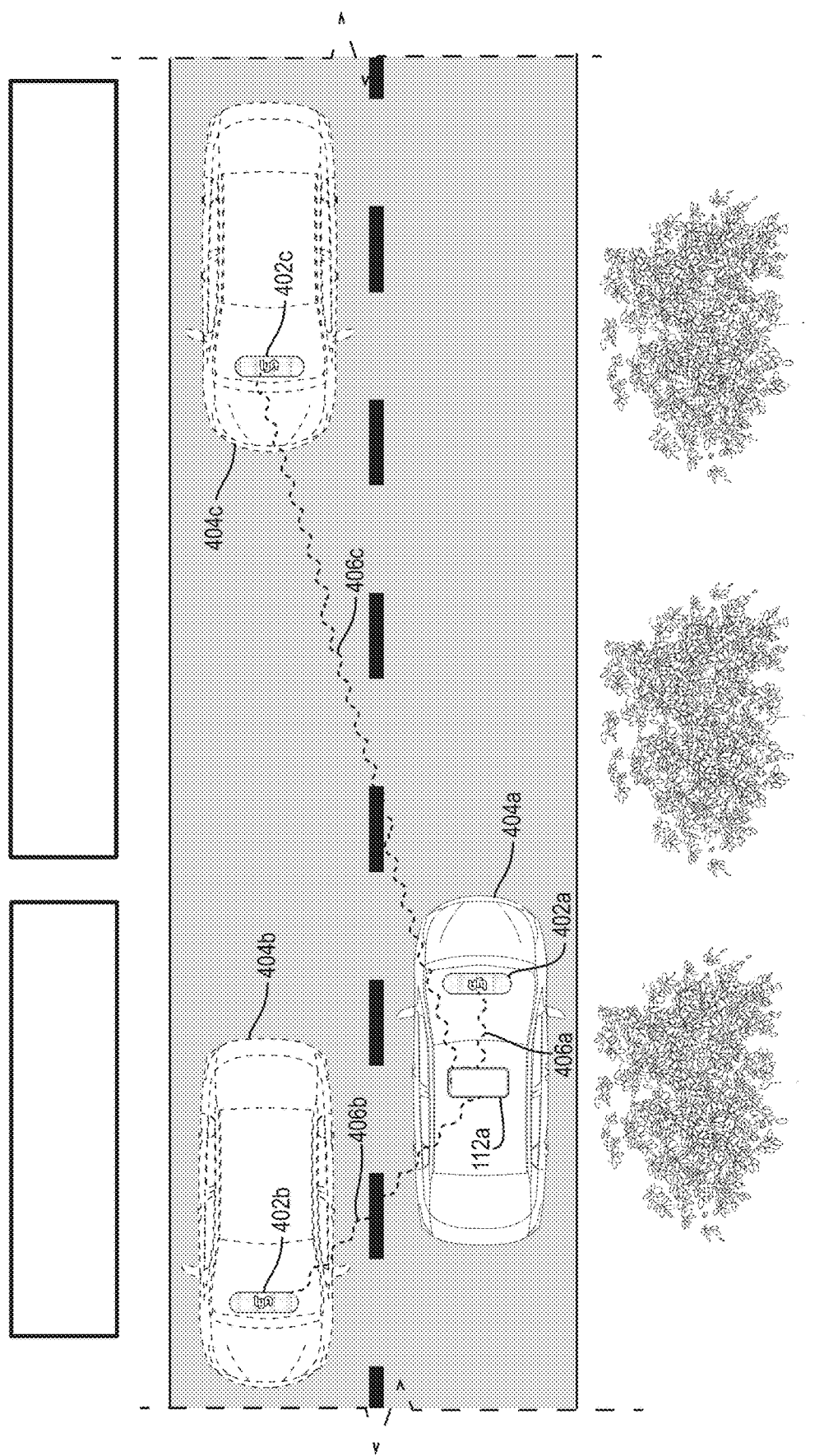
FIGS. 4A-4B illustrate a provider client device detecting a wireless broadcast signal from an auxiliary computing device at different time periods corresponding to different locations and automatically initiating a wireless connection with the auxiliary computing device based on a signal strength of the wireless broadcast signal in accordance with one or more embodiments.
Figure 4B:
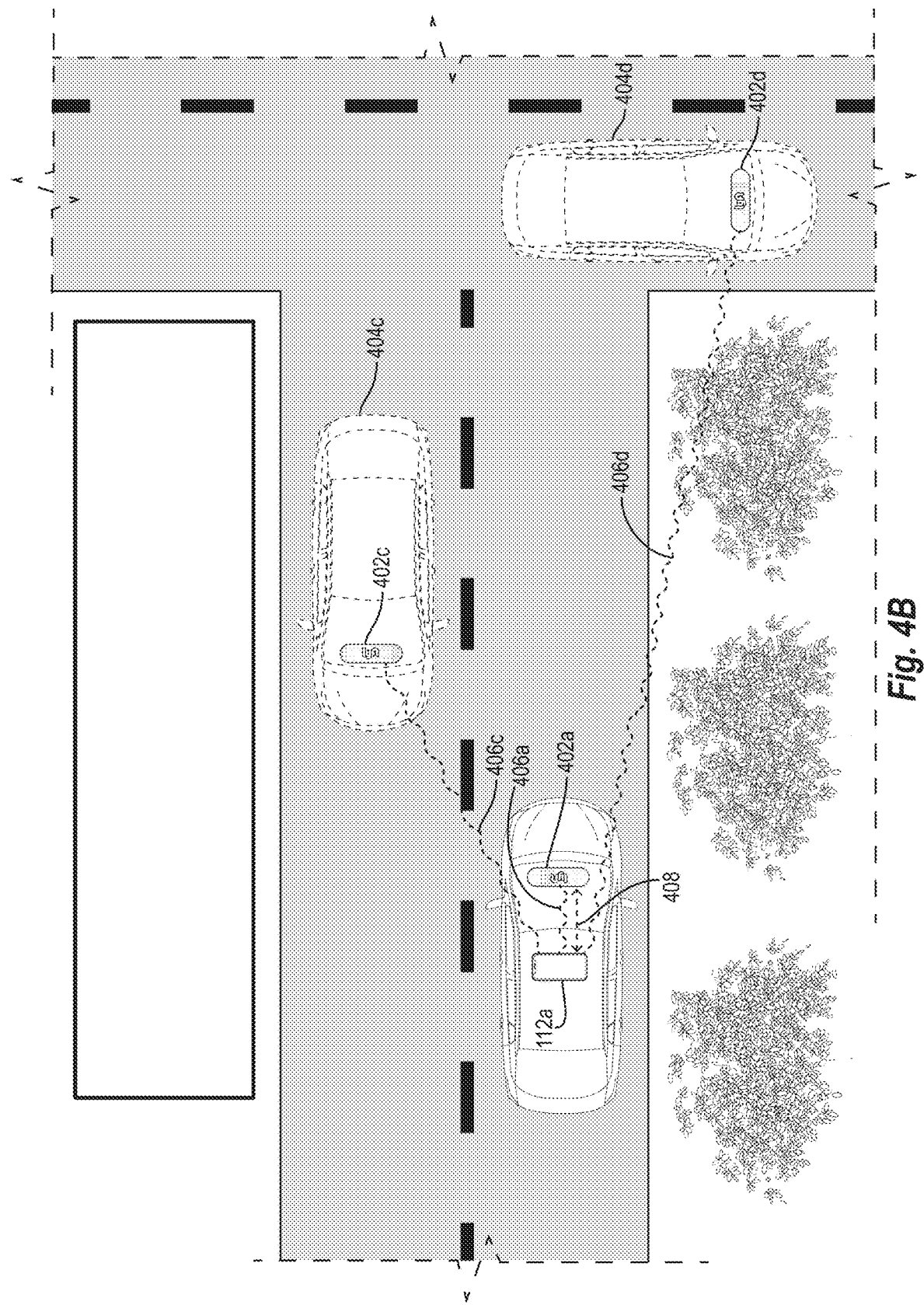

Turning now to FIGS. 4A-4B, these figures illustrate the provider client device 112a detecting a wireless broadcast signal from an auxiliary computing device at different time periods corresponding to different locations. At the different locations, the provider client device 112a optionally scans for and detects wireless broadcast signals comprising device identifiers (or device names) corresponding to a same type of auxiliary computing device. Based on the wireless broadcast signal satisfying a signal-strength threshold at the different time periods and different locations, the provider client device 112a automatically initiates a wireless network connection with the auxiliary computing device. As described below, the locations depicted in FIGS. 4A-4B refer to locations of the provider client device 112a.

As shown in FIG. 4A at a first location corresponding to a first time period, a transportation vehicle 404a includes the provider client device 112a and an auxiliary computing device 402a. Transportation vehicles 404b and 404c are located nearby the first location and include auxiliary computing devices 402b and 402c, respectively. While the auxiliary computing devices 402b and 402c are nearby the first location of the provider client device 112a, the auxiliary computing device 402a within the transportation vehicle 404a is closer in proximity to the provider client device 112a.

At the first time period corresponding to the first location in FIG. 4A, the provider client device 112a detects (and determines a signal strength of) one or both of (i) a wireless broadcast signal 406a from the auxiliary computing device 402a and (ii) wireless broadcast signals 406b and 406c respectively from the auxiliary computing devices 402b and 402c. Each wireless broadcast signal comprises a unique device identifier (or unique device name) corresponding to a same type of auxiliary computing device (e.g., a device identifier or device name identifying an in-vehicle-display device). Consistent with the disclosure above, the provider client device 112a determines that the wireless broadcast signal 406a satisfies a signal-strength threshold at the first time period corresponding to the first location.

As shown in FIG. 4B, the transportation vehicle 404a transports the provider client device 112a to a different location. Upon transport, the provider client device 112a detects or receives GPS data indicating a second location depicted in FIG. 4B that is a threshold distance from the first location depicted in FIG. 4A. As further shown in FIG. 4B, transportation vehicles 404c and 404d are located nearby the second location and include auxiliary computing devices 402c and 402d, respectively. While the auxiliary computing devices 402c and 402d are nearby the second location of the provider client device 112a, the auxiliary computing device 402a within the transportation vehicle 404a is again closer in proximity to the provider client device 112a.

At the second time period corresponding to the second location, the provider client device 112a detects (and determines a signal strength of) one or both of (i) the wireless broadcast signal 406a from the auxiliary computing device 402a and (ii) wireless broadcast signals 406c and 406d respectively from the auxiliary computing devices 402c and 402d. As before, each wireless broadcast signal comprises a unique device identifier (or unique device name) corresponding to a same type of auxiliary computing device (e.g., a device identifier or device name identifying a wireless camera). Consistent with the disclosure above, the provider client device 112a again determines that the wireless broadcast signal 406a satisfies a signal-strength threshold at the second time period corresponding to the second location.

Based on determining that the wireless broadcast signal 406a from the auxiliary computing device 402a satisfies the signal-strength threshold at the first location corresponding to the first time period and at the second location corresponding to the second time period, the provider client device 112a automatically initiates a wireless network connection 408 between the provider client device 112a and the auxiliary computing device 402a. In some embodiments, the provider client device 112a detects (and determines a signal strength of) wireless broadcast signals at subsequent locations corresponding to subsequent time periods before initiating the wireless network connection 408. By identifying a wireless broadcast signal and a corresponding auxiliary computing device based on a signal-strength threshold across locations and corresponding time periods, the provider client device 112a can more accurately initiate a wireless connection with an auxiliary computing device in closer proximity than other auxiliary computing devices across locations—without the user errors caused by conventional user interfaces of computing devices or errors of existing computing devices focused on the signal strength from a single device in a single time frame with optional periodic updates.

Figure 5A:
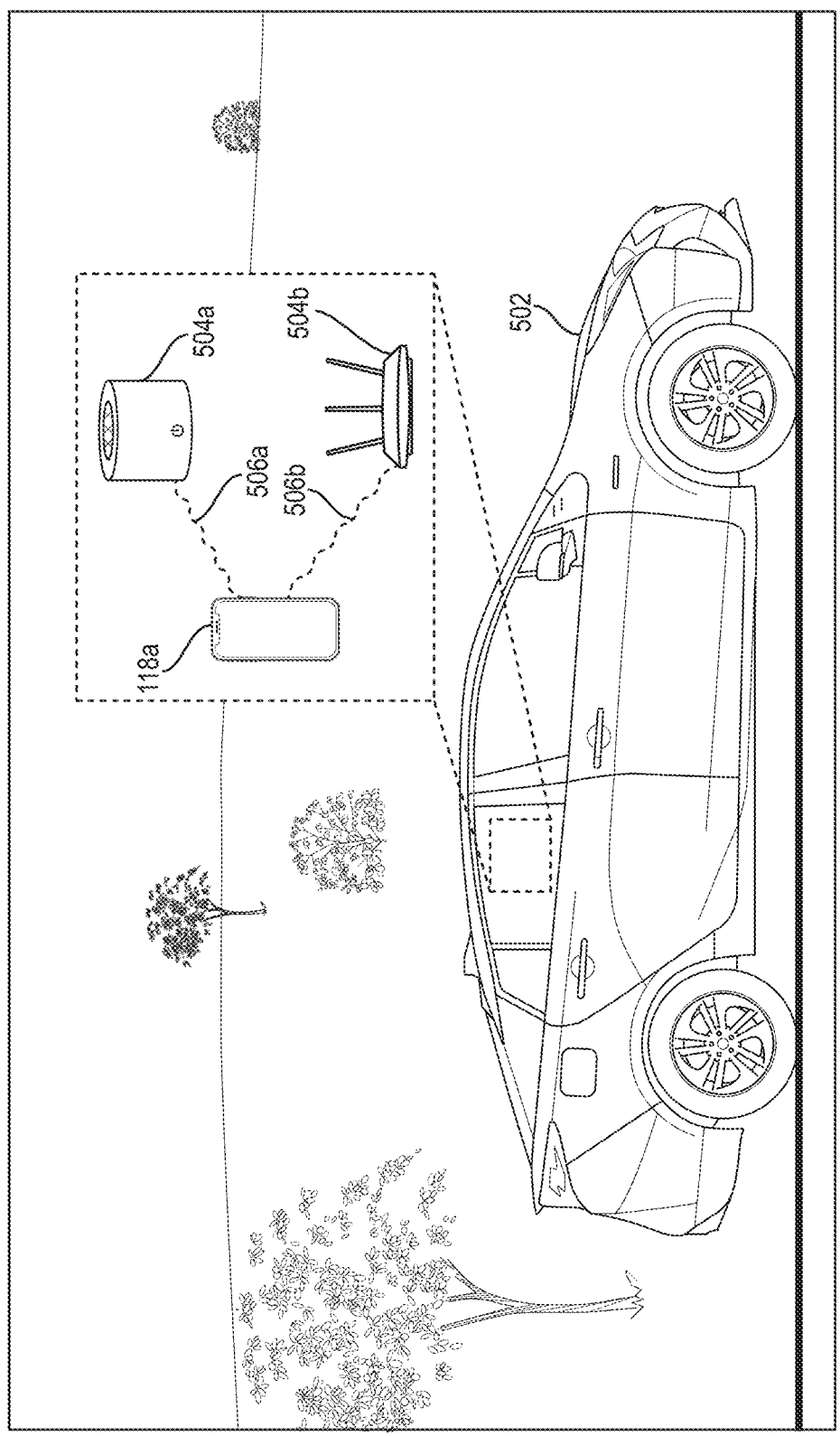
FIGS. 5A-5B a requestor client device detecting a wireless broadcast signal from an auxiliary computing device at multiple time periods and automatically initiating a wireless connection with the auxiliary computing device based on a signal strength of the wireless broadcast signal in accordance with one or more embodiments.
Figure 5B:
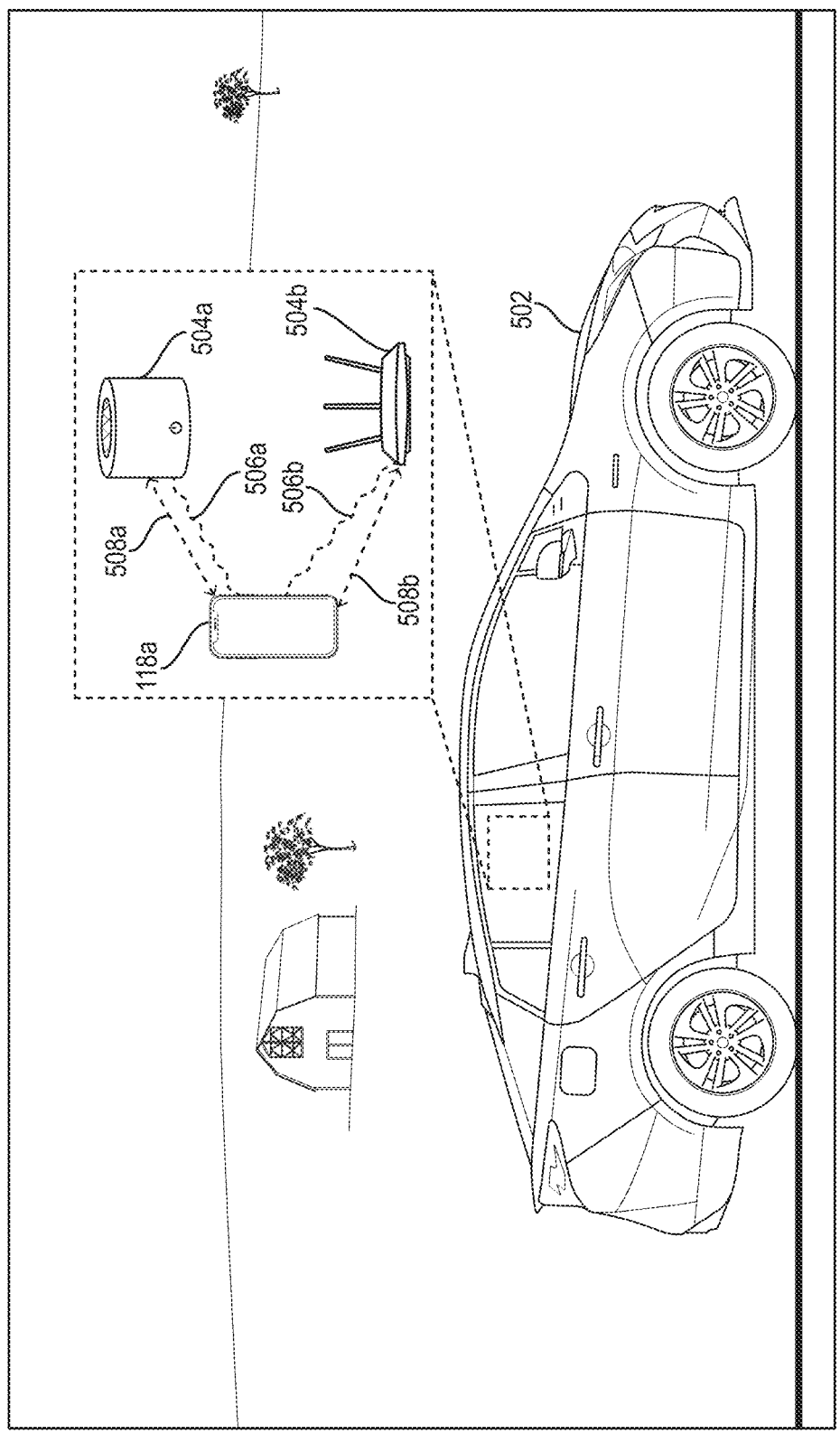

Turning now to FIGS. 5A-5B, these figures illustrate the requestor client device 118a detecting a wireless broadcast signal from a first auxiliary computing device 504a and a second auxiliary computing device 504b at different time periods corresponding to different locations. At or near different locations, the requestor client device 118a optionally scans for and detects wireless broadcast signals comprising device identifiers (or device names) corresponding to different types of auxiliary computing devices. Based on a first wireless broadcast signal 506a satisfying a first signal-strength threshold—and a second wireless broadcast signal 506b satisfying a second signal-strength threshold—at different locations, the requestor client device 118a automatically initiates a wireless network connection with one or both of the first auxiliary computing device 504a and the second auxiliary computing device 504b. As described below, the locations depicted in FIGS. 5A-5B refer to locations of the requestor client device 118a.

As shown in FIG. 5A at a first location corresponding to a first time period, a transportation vehicle 502 includes the requestor client device 118a, the first auxiliary computing device 504a, and the second auxiliary computing device 504b. In some embodiments, the requestor client device 118a detects or receives GPS data indicating the first location when (i) the requestor client device 118a is located at a pickup location, (ii) the requestor client device 118a receives an indication from the transportation matching system 104 that the transportation vehicle 502 has arrived at the pickup location, or (iii) the requestor client device 118a receives an indication from the transportation matching system 104 that the transportation vehicle 502 has picked up the requestor 116a for transportation.

By contrast, in some embodiments, the first location of the requestor client device 118a is a threshold distance from a pickup location or corresponds to a location at which the requestor client device 118a launches (or detects selections of an option corresponding to) a requestor transport application. For instance, the first location may correspond to an initial location at which the requestor client device 118a launches the requestor transport application (or detects a selection of an option for audio or video within a graphical user interface) after the transportation matching system 104 sends an indication to the requestor client device 118a that the transportation vehicle 502 has picked up the requestor 116a at a pickup location.

At the first time period corresponding to the first location in FIG. 5A, the requestor client device 118a detects (and determines a signal strength of) one or both of a first wireless broadcast signal 506a from the first auxiliary computing device 504a and a second wireless broadcast signal 506b from the second auxiliary computing device 504b. Alternatively, the requestor client device 118a detects (and determines a signal strength of) the first wireless broadcast signal 506a at the first time period corresponding to the first location and the second wireless broadcast signal 506b at or near the first time period corresponding to a location at or near the first location (e.g., within feet or meters of the first location).

In some embodiments, the first wireless broadcast signal 506a comprises a unique device identifier (or a unique device name) corresponding to a first type of auxiliary computing device (e.g., a wireless speaker, a wireless camera, or a wireless video monitor); and the second wireless broadcast signal 506b comprises a unique device identifier (or a unique device name) corresponding to a second type of auxiliary computing device (e.g., a router within or integrated with the transportation vehicle 502). Further, in certain implementations, the first wireless broadcast signal 506a comports with a first wireless connection protocol (e.g., Bluetooth), while the second wireless broadcast signal 506b comports with a second wireless connection protocol (e.g., Wi-Fi). Although not shown in FIG. 5A, the requestor client device 118a may also detect and determine signal strength of additional wireless broadcast signals at the first time period (e.g., from additional auxiliary computing devices located outside the transportation vehicle 502).

Consistent with the disclosure above, the requestor client device 118a determines that the first wireless broadcast signal 506a satisfies a first signal-strength threshold at or near the first time period corresponding to the first location. In some embodiments, the requestor client device 118a further determines that the second wireless broadcast signal 506b satisfies a second signal-strength threshold at or near the first time period corresponding to the first location. When determining that a wireless broadcast signal satisfies the first or second signal-strength thresholds, the requestor client device 118a optionally compares one or both of the first wireless broadcast signal 506a and the second wireless broadcast signal 506b respectively to other wireless broadcast signals.

In some cases, the first signal-strength threshold corresponds to a first type of auxiliary computing device (e.g., a wireless speaker); and the second signal-strength threshold corresponding to a second type of auxiliary computing device (e.g., a wireless camera). Additionally, or alternatively, in certain implementations, the first signal-strength threshold corresponds to a first wireless connection protocol (e.g., Bluetooth), and the second signal-strength threshold corresponding to a second wireless connection protocol (e.g., Wi-Fi). Accordingly, the requestor client device 118a may compare the first wireless broadcast signal 506a to other detected wireless broadcast signals from one or both of a same type of auxiliary computing device and a same wireless connection protocol within a detection range. Similarly, the requestor client device 118a may compare the second wireless broadcast signal 506b to other detected wireless broadcast signals from one or both of a same type of auxiliary computing device and a same wireless connection protocol within a detection range.

As shown in FIG. 5B, the transportation vehicle 504 transports the requestor client device 118a to a different location. Upon transport, the requestor client device 118a detects or receives GPS data indicating a second location depicted in FIG. 5B that is a threshold distance from the first location depicted in FIG. 5A. In some embodiments, the second location is located a threshold distance from a pickup location (e.g., located more than or equal to 30 feet or 20 meters from the pickup location). In certain implementations, the second location marks a location corresponding to a threshold time since the transportation vehicle 502 departs from a pickup location (e.g., milliseconds or seconds since departing from the pickup location).

At the second time period corresponding to the second location in FIG. 5B, the requestor client device 118a again detects (and determines a signal strength of) one or both of the first wireless broadcast signal 506a from the first auxiliary computing device 504a and the second wireless broadcast signal 506b from the second auxiliary computing device 504*b*. Alternatively, the requestor client device 118*a* detects (and determines a signal strength of) the first wireless broadcast signal 506*a* at the second time period corresponding to the second location and the second wireless broadcast signal 506*b* at or near the second time period corresponding to a location at or near the second location (e.g., within feet or meters of the second location).

Consistent with the disclosure above, the requestor client device 118*a* determines that the first wireless broadcast signal 506*a* satisfies the first signal-strength threshold—and that the second wireless broadcast signal 506*b* satisfies the second signal-strength threshold—at or near the second time period corresponding to the second location. Although not shown in FIG. 5B, the requestor client device 118*a* may also detect and determine the signal strength of additional wireless broadcast signals at or near the second time period (e.g., from additional auxiliary computing devices located outside the transportation vehicle 502) when determining whether signals satisfy the first or second signal-strength threshold.

Based on determining that the first wireless broadcast signal 506*a* satisfies the first signal-strength threshold at the first location corresponding to the first time period and at the second location corresponding to the second time period, in some embodiments, the requestor client device 118*a* automatically initiates a wireless network connection 508*a* between the requestor client device 118*a* and the first auxiliary computing device 504*a*. Similarly, based on determining that the second wireless broadcast signal 506*b* satisfies the second signal-strength threshold at or near the first location corresponding to the first time period and at or near the second location corresponding to the second time period, in some embodiments, the requestor client device 118*a* automatically initiates a wireless network connection 508*b* between the requestor client device 118*a* and the second auxiliary computing device 504*b*. In some embodiments, the requestor client device 118*a* detects (and determines a signal strength of) wireless broadcast signals at subsequent locations corresponding to subsequent time periods before initiating one or both of the wireless network connection 508*a* and 508*b*.

In addition to the requestor client device 118*a* connecting with multiple auxiliary computing devices, in some embodiments, multiple requestor client devices perform (or attempt to perform) the functions shown in FIGS. 5A-5B. In a given time period (e.g., one day, several hours), an auxiliary computing device may receive wireless signals initiating a wireless network connection from multiple requestor client devices or at multiple times from a same requestor client device. As requestors enter and exit the transportation vehicle 502 through a time period, for example, one or more requestor client devices may attempt to establish wireless network connections with the first auxiliary computing device 504*a*. In some such embodiments, the first auxiliary computing device 504*a* can determine that a requestor client device satisfies a signal-strength threshold across multiple time periods and initiate a wireless network connection with the requestor client device.

This disclosure describes the requestor client device 118*a* as performing various functions in FIGS. 5A-5B. In some embodiments, however, a provider client device can perform the same or similar functions performed by the requestor client device 118*a* in FIGS. 5A-5B, except that such a provider client device launches, executes, and detects selections within a graphical user interface for a provider transport application. For example, in some embodiments, the provider client device 112*a* detects or receives GPS data indicating the first location in FIG. 5A when (i) the provider client device 112*a* is located at a pickup location, (ii) the provider client device 112*a* receives an indication from the transportation matching system 104 that the transportation vehicle 502 has arrived at the pickup location, or (iii) the provider client device 112*a* detects a selection by provider 110*a* that the provider 110*a* (or the transportation vehicle 502) has picked up the requestor 116*a* for transportation.

Figure 6A:
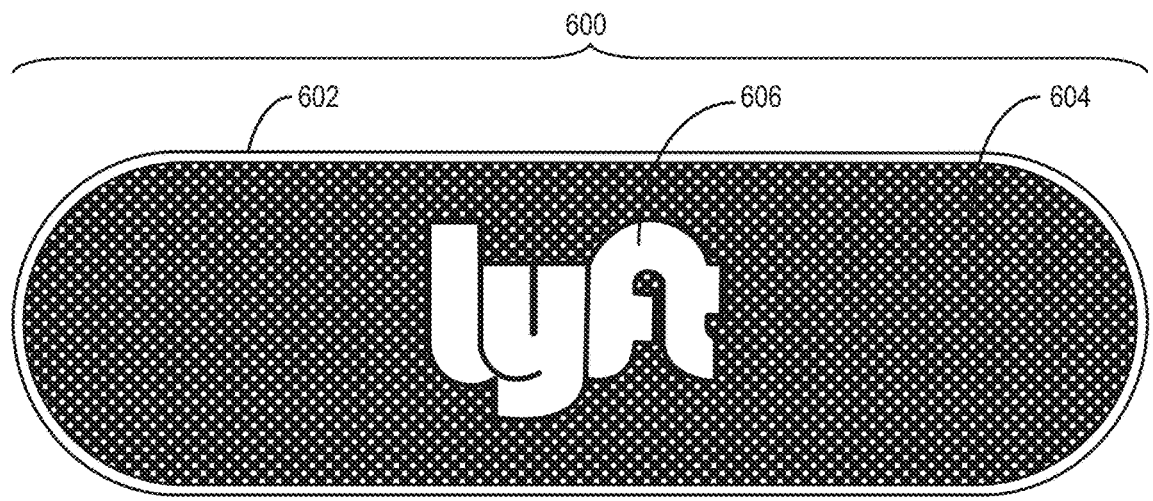
FIGS. 6A-6B illustrate an in-vehicle-display device from various perspectives in accordance with one or more embodiments.
Figure 6B:
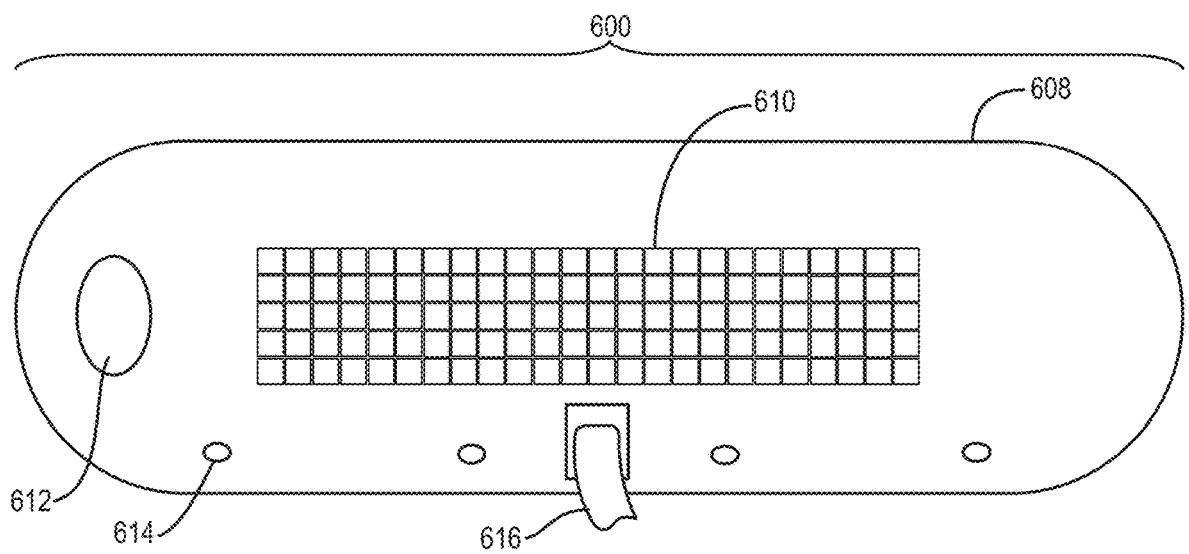

FIGS. 6A-6B show an example of an in-vehicle-display device 600 in accordance with various embodiments. As suggested above, the in-vehicle-display device 600 can communicate messages using any combination of graphics, messages, colors, or patterns. FIG. 6A illustrates a front view 602 of the in-vehicle-display device 600 shows a front display 604. In some embodiments, the front display 604 may include a secondary region or a separate display 606. As shown in FIG. 6A, the front display 604 may include various display technologies including, but not limited to, one or more liquid crystal displays ("LCDs"), one or more arrays of light emitting diodes ("LEDs"), or other display technologies.

In some embodiments, the front display 604 may include a cover that divides the display into multiple regions. In some embodiments, separate displays may be associated with each region. The front display 604 can be configured to show colors, patterns, color patterns, or other identifying information to requestors and other users external to a transportation vehicle. In some embodiments, the secondary region or the separate display 606 may be configured to display the same, or contrasting, information as the front display 604.

FIG. 6B illustrates a rear view 608 of the in-vehicle-display device 600, including a rear display 610. As with the front display 604, the rear display 610 may include various display technologies including, but not limited to, one or more LCDs, one or more arrays of LEDs, or other display technologies. The rear display 610 may be configured to display information to a provider, a requestor, or other users internal to a transportation vehicle. In some embodiments, the rear display 610 may be configured to provide information to users who are located behind the transportation vehicle.

As further shown in FIG. 6B, the in-vehicle-display device 600 may include a power button 612 or other switch that can be used to turn on or off the in-vehicle-display device 600. In various embodiments, the power button 612 may be a hardware button or switch that physically controls whether power is provided to the in-vehicle-display device 600. Alternatively, the power button 612 may be a soft button that initiates a startup/shutdown procedure managed by software and/or firmware instructions. By contrast, the in-vehicle-display device 600 optionally does not include the power button 612. The in-vehicle-display device 600 may include one or more light features 614 (such as one or more LEDs or other light sources) configured to illuminate areas adjacent to the in-vehicle-display device 600. In some embodiments, the in-vehicle-display device 600 can include a connector to enable a provider client device to connect to the in-vehicle-display device 600. In some embodiments, a connector 616 facilitates providing power to the in-vehicle-display device 600.

In addition (or in the alternative) to the description above, in some embodiments, a provider client device detects wireless broadcast signals from and optionally connect with in-vehicle-display devices described a provider communication devices by Yuanyuan Pao et al., Geohash-related Location Predictions, U.S. application Ser. No. 15/479,118 (filed Apr. 4, 2017), and Ethan Duncan Eyler et al., Identifying Matched Requestors and Providers, U.S. application Ser. No. 15/396,417 (filed Dec. 30, 2017), the entire contents of which are hereby incorporated by reference.

Figure 7:
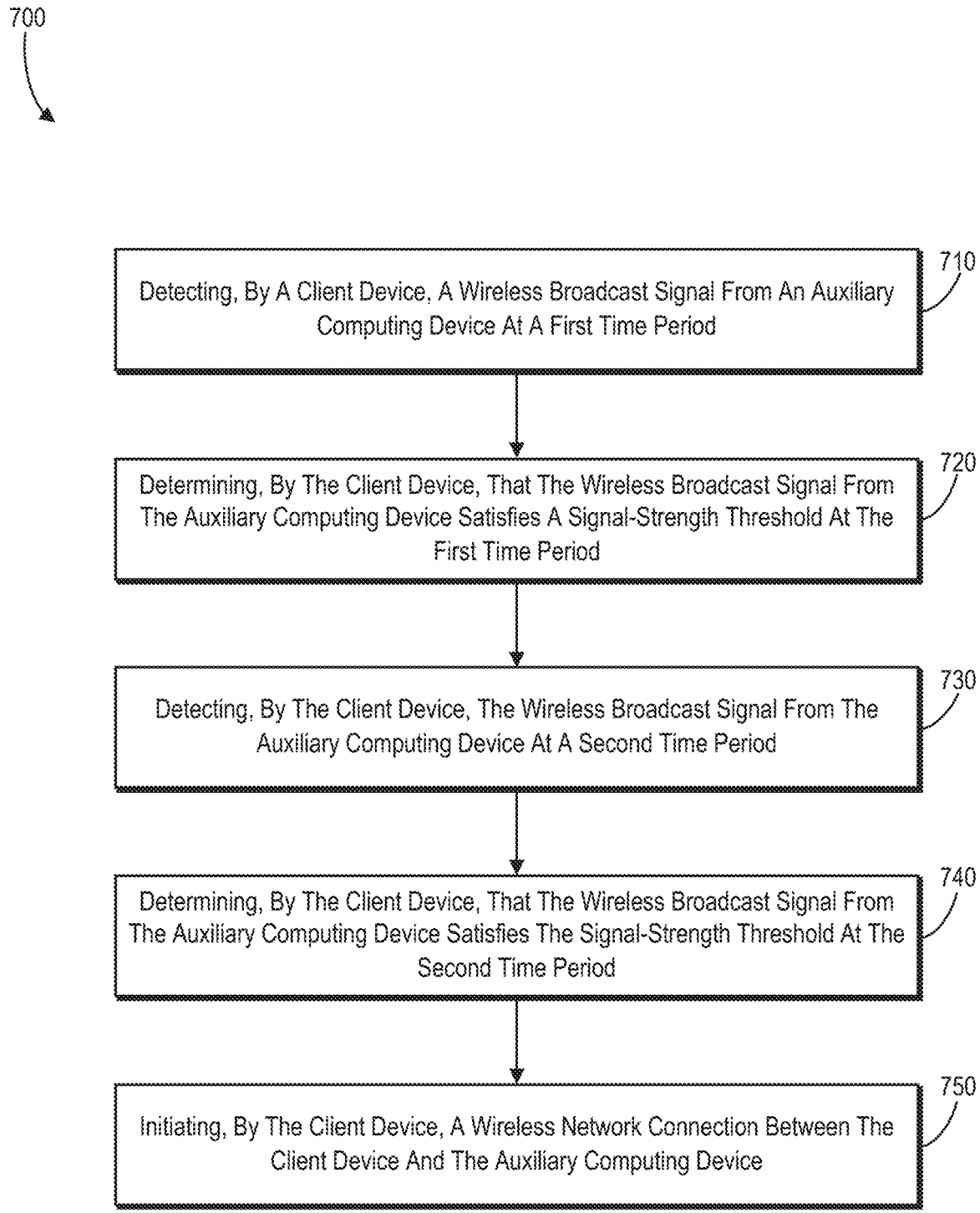
FIG. 7 illustrates a flowchart of a series of acts for a client device automatically initiating a wireless connection with an auxiliary computing device from among multiple auxiliary computing devices based on recurring detection of a wireless broadcast signal from the auxiliary computing device in accordance with one or more embodiments.

Turning now to FIG. 7, this figure illustrates a flowchart of a series of acts 700 of a client device automatically initiating a wireless network connection with an auxiliary computing device from among multiple auxiliary computing devices based on recurring detection of a wireless broadcast signal from the auxiliary computing device in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 700 include an act 710 of detecting, by a client device, a wireless broadcast signal from an auxiliary computing device at a first time period. In particular, in some embodiments, the act 710 includes detecting, by a client device, a wireless broadcast signal at a first time period, the wireless broadcast signal comprising a device identifier for an auxiliary computing device. Further, in some embodiments, the act 710 includes detecting, by a client device, a plurality of wireless broadcast signals from a plurality of auxiliary computing devices at a first time period, each wireless broadcast signal comprising a particular device identifier for a particular auxiliary computing device. For example, in certain implementations, detecting the plurality of wireless broadcast signals at the first time period comprises detecting a plurality of Bluetooth broadcast signals or a plurality of wireless fidelity ("Wi-Fi") broadcast signals at the first time period.

Further, in some embodiments, the client device comprises a provider client device including a provider transport application and the auxiliary computing device comprises an in-vehicle-display device for communicating messages to requestors of a transportation-matching system. By contrast, in certain implementations, the client device comprises a requestor client device including a requestor transport application and the auxiliary computing device comprises at least one of a wireless camera, a wireless video camera, a wireless speaker, or a wireless video monitor.

As further shown in FIG. 7, the acts 700 include an act 720 of determining, by the client device, that the wireless broadcast signal from the auxiliary computing device satisfies a signal-strength threshold at the first time period. In particular, in some embodiments, the act 720 includes determining, by the client device, that a wireless broadcast signal from the plurality of wireless broadcast signals satisfies a signal-strength threshold at the first time period, the wireless broadcast signal comprising a device identifier for an auxiliary computing device from the plurality of auxiliary computing devices.

For example, in some embodiments, determining that the wireless broadcast signal satisfies the signal-strength threshold at the first time period comprises determining that the wireless broadcast signal corresponds to a strongest wireless broadcast signal from among the plurality of wireless broadcast signals at the first time period. Further, in certain implementations, determining that the wireless broadcast signal satisfies the signal-strength threshold at the first time period comprises determining that the wireless broadcast signal corresponds to a highest detected decibel value or wattage value from among the plurality of wireless broadcast signals corresponding to a plurality of detected decibel values or a plurality of detected wattage values at the first time period.

As suggested above, in some embodiments, determining that the wireless broadcast signal satisfies the signal-strength threshold at the first time period comprises: ranking the plurality of wireless broadcast signals from the plurality of auxiliary computing devices according to wireless-signal strength; and determining that the wireless broadcast signal from the auxiliary computing device corresponds to a highest ranked wireless broadcast signal from among the plurality of wireless broadcast signals.

As further shown in FIG. 7, the acts 700 include an act 730 of detecting, by the client device, the wireless broadcast signal from the auxiliary computing device at a second time period. In particular, in certain implementations, the act 730 includes detecting, by the client device, an additional plurality of wireless broadcast signals from an additional plurality of auxiliary computing devices at a second time period.

By contrast, in some embodiments, the act 730 includes determining, by the client device, additional wireless broadcast signals from the plurality of wireless broadcast signals are not detected at the second time period. Further, in certain implementations, the act 730 further includes detecting, by the client device, additional wireless broadcast signals from the plurality of wireless broadcast signals at the second time period; and determining, by the client device, that the additional wireless broadcast signals from the plurality of wireless broadcast signals do not satisfy the signal-strength threshold at the second time period.

As further shown in FIG. 7, the acts 700 include an act 740 of determining, by the client device, that the wireless broadcast signal from the auxiliary computing device satisfies the signal-strength threshold at the second time period and an act 750 of initiating, by the client device, a wireless network connection between the client device and the auxiliary computing device. In particular, in some embodiments, the act 750 includes, based on determining that the wireless broadcast signal from the auxiliary computing device satisfies the signal-strength threshold at the first and second time periods, initiating, by the client device, a wireless network connection between the client device and the auxiliary computing device.

In addition to the acts 710-750, in certain implementations, the acts 700 further include detecting, by the client device, the plurality of wireless broadcast signals when the client device is located at a first location at the first time period; determining, by the client device, that the client device is located at a second location that is a threshold distance from the first location; and detecting, by the client device, the wireless broadcast signal from the auxiliary computing device when the client device is located at the second location at the second time period.

In particular, in some cases, the acts 700 further include detecting, by the client device, the plurality of wireless broadcast signals when the client device is located at a first location indicated by a first set of Global Positioning System ("GPS") data from the client device at the first time period; determining, by the client device, that the client device is located at a second location indicated by a second set of GPS data from the client device, the second location a threshold distance from the first location; and detecting, by the client device, the wireless broadcast signal from the auxiliary computing device when the client device is located at the second location at the second time period.

Additionally, in some embodiments, the acts 700 further include detecting, by the client device, the plurality of wireless broadcast signals based on the client device launching a provider transport application at the first time period; and detecting, by the client device, the wireless broadcast signal from the auxiliary computing device based on the client device launching the provider transport application at the second time period.

As further suggested above, in certain implementations, the acts 700 include storing, by the client device, the device identifier for the auxiliary computing device in a non-transitory-computer-readable storage medium based on determining that the wireless broadcast signal from the auxiliary computing device satisfies the signal-strength threshold at the first time period; and detecting the wireless broadcast signal from the auxiliary computing device at the second time period by scanning for the wireless broadcast signal corresponding to the stored device identifier. Similarly, in some embodiments, the acts 700 further include storing, by the client device, the device identifier for the auxiliary computing device in a non-transitory-computer-readable storage medium based on determining that the wireless broadcast signal from the auxiliary computing device corresponds to the highest ranked wireless broadcast signal.

Additionally, in some embodiments, the acts 700 include detecting, by the client device, the wireless broadcast signal from the auxiliary computing device at additional time periods in separate intervals; determining, by the client device, that the wireless broadcast signal from the auxiliary computing device satisfies the signal-strength threshold at the additional time periods in the separate intervals; and based on determining that the wireless broadcast signal from the auxiliary computing device satisfies the signal-strength threshold at the first time period, the second time period, and the additional time periods, initiating, by the client device, the wireless network connection between the client device with the auxiliary computing device.

As noted above, a client device sometimes determines an auxiliary computing device with which it initiates a wireless network connection is unavailable. In some embodiments, the acts 700 further include determining, by the client device, the auxiliary computing device is unavailable for establishing the wireless network connection; detecting, by the client device, an additional wireless broadcast signal at additional time periods in separate intervals, the additional wireless broadcast signal comprising an additional device identifier for an additional auxiliary computing device; determining, by the client device, that the additional wireless broadcast signal from the additional auxiliary computing device satisfies the signal-strength threshold at the additional time periods in the separate intervals; and based on determining that the additional wireless broadcast signal from the additional auxiliary computing device satisfies the signal-strength threshold at the additional time periods, initiating, by the client device, the wireless network connection between the client device and the additional auxiliary computing device.

By contrast, in some cases, a client device successfully initiates a wireless network connection or later reconnecting with an auxiliary computing device. For example, in some embodiments, the acts 700 further include detecting, by the client device, a user interaction accepting a transportation request from a transportation matching system; detecting, by the client device, the wireless broadcast signal from the auxiliary computing device among a plurality of wireless broadcast signals; and connecting, by the client device, with the auxiliary computing device for a duration of transportation corresponding to the accepted transportation request.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 8:
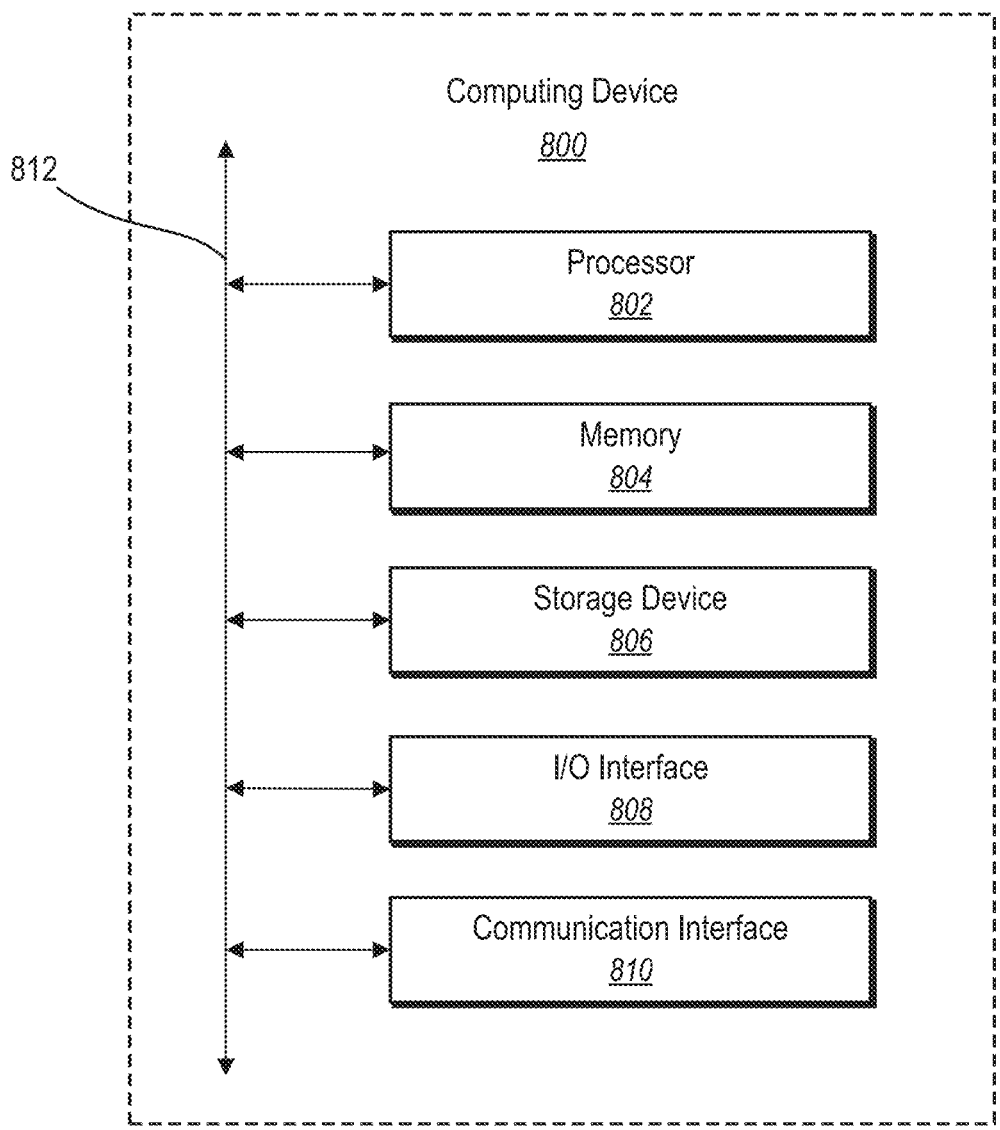
FIG. 8 illustrates a block diagram of a computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., server(s) 102, provider client devices 112a-112n, requestor client devices 118a-118n, in-vehicle-display devices 114a-114n, or auxiliary computing devices 204a-204g). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive ("HDD"), flash memory, a Universal Serial Bus ("USB") drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller ("NIC") or network adapter for communicating with an Ethernet or other wire-based network or a wireless NIC ("WNIC") or wireless adapter for communicating with a wireless network, such as a WI-FI. The computing device 800 can further include a bus 812. The bus 812 can include hardware, software, or both that connects components of computing device 800 to each other.

Figure 9:
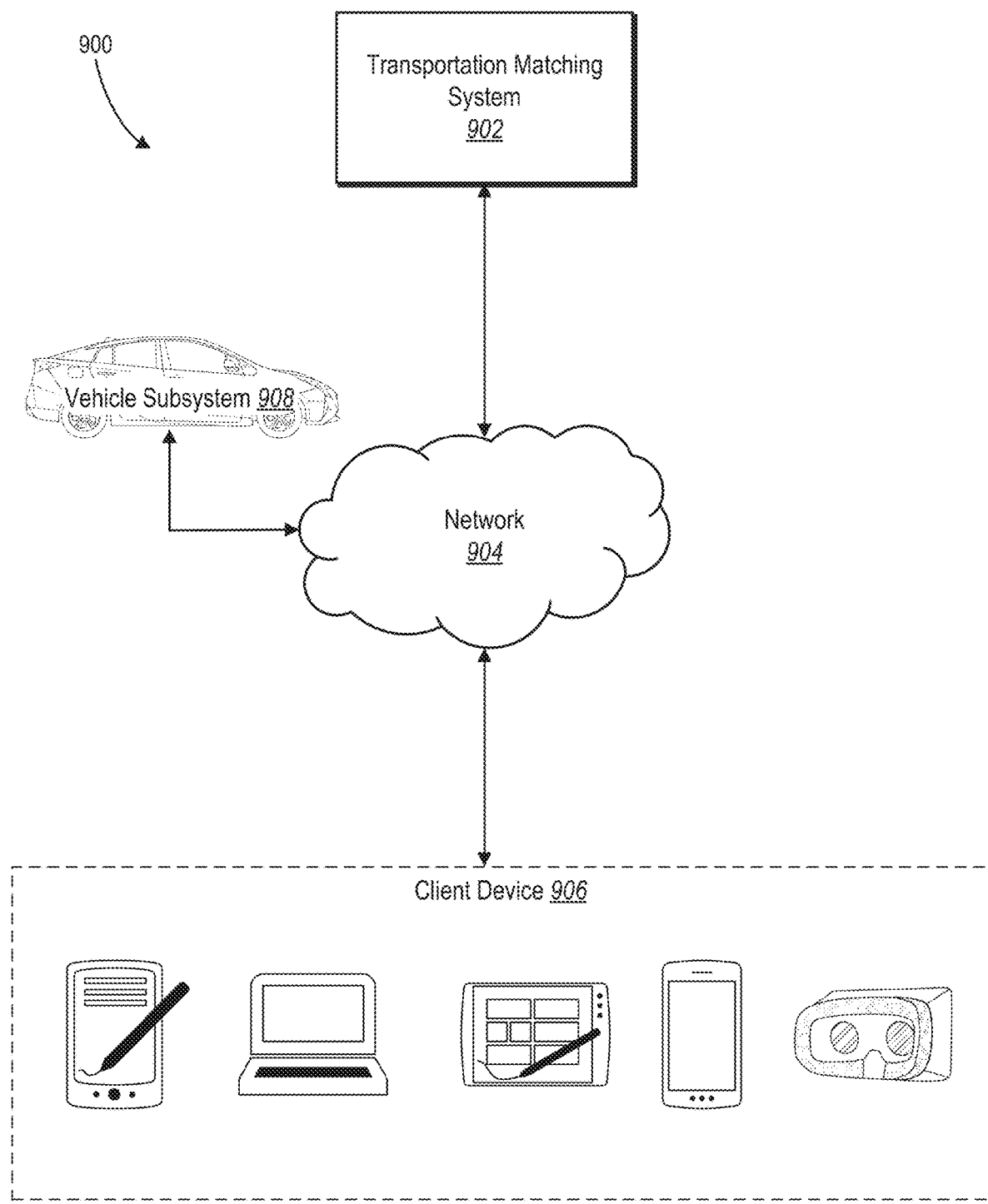
FIG. 9 illustrates an example environment for a transportation matching system in accordance with one or more embodiments.

FIG. 9 illustrates an example network environment 900 of a transportation matching system (e.g., the transportation matching system 104). The network environment 900 includes a client device 906, a transportation matching system 902, and a vehicle subsystem 908 connected to each other by a network 904. Although FIG. 9 illustrates a particular arrangement of the client device 906, the transportation matching system 902, the vehicle subsystem 908, and the network 904, this disclosure contemplates any suitable arrangement of the client device 906, the transportation matching system 902, the vehicle subsystem 908, and the network 904. As an example, and not by way of limitation, two or more of the client device 906, the transportation matching system 902, and the vehicle subsystem 908 communicate directly, bypassing the network 904. As another example, two or more of the client device 906, the transportation matching system 902, and the vehicle subsystem 908 may be physically or logically co-located with each other in whole or in part. Moreover, although FIG. 9 illustrates a particular number of the client devices 906, the transportation matching systems 902, the vehicle subsystems 908, and the networks 904, this disclosure contemplates any suitable number of the client devices 906, the transportation matching systems 902, the vehicle subsystems 908, and the networks 904. As an example, and not by way of limitation, the network environment 900 may include multiple client devices 906, the transportation matching systems 902, the vehicle subsystems 908, and the networks 904.

This disclosure contemplates any suitable network 904. As an example, and not by way of limitation, one or more portions of the network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. The network 904 may include one or more networks 904.

Links may connect the client device 906, the transportation matching system 902, and the vehicle subsystem 908 to the network 904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by the client device 906. As an example, and not by way of limitation, a client device 906 may include any of the computing devices discussed above in relation to FIG. 8. A client device 906 may enable a network user at the client device 906 to access a network. A client device 906 may enable its user to communicate with other users at other client devices 906.

In particular embodiments, the client device 906 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 906 one or more Hyper Text Markup Language ("HTML") files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 902 may be a network-addressable computing system that can host a ride share transportation network. The transportation matching system 902 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 902. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 902 may manage ride matching services to connect a user/requester with a vehicle and/or provider. By managing the ride matching services, the transportation matching system 902 can manage the distribution and allocation of vehicle subsystem resources and user resources such as GPS location and availability indicators, as described herein.

The transportation matching system 902 may be accessed by the other components of the network environment 900 either directly or via network 904. In particular embodiments, the transportation matching system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or a transportation matching system 902 to manage, retrieve, modify, add, or delete, the information stored in data store.

In particular embodiments, the transportation matching system 902 may provide users with the ability to take actions on various types of items or objects, supported by the transportation matching system 902. As an example, and not by way of limitation, the items and objects may include ride share networks to which users of the transportation matching system 902 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 902 or by an external system of a third-party system, which is separate from the transportation matching system 902 and coupled to the transportation matching system 902 via a network 904.

In particular embodiments, the transportation matching system 902 may be capable of linking a variety of entities. As an example, and not by way of limitation, the transportation matching system 902 may enable users to interact with each other or other entities, or to allow users to interact with these entities through an application programming interfaces ("API") or other communication channels.

In particular embodiments, the transportation matching system 902 may include a variety of servers, sub-systems, programs, modules, logs, and data stores. In particular embodiments, the transportation matching system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 902 may also include suitable components such as network interfaces, security mechanisms, load balancers, failover servers, management-and-network-operations consoles, other suitable components, or any suitable combination thereof. In particular embodiments, the transportation matching system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 902 and one or more client devices 906. An action logger may be used to receive communications from a web server about a user's actions on or off the transportation matching system 902. In conjunction with the action log, a third-party-content-object log may be maintained of user exposures to third-party-content objects. A notification controller may provide information regarding content objects to a client device 906. Information may be pushed to a client device 906 as notifications, or information may be pulled from the client device 906 responsive to a request received from the client device 906. Authorization servers may be used to enforce one or more privacy settings of the users of the transportation matching system 902. A privacy setting of a user determines how particular information associated with a user can be shared. The authorization server may allow users to opt in to or opt out of having their actions logged by the transportation matching system 902 or shared with other systems, such as, for example, by setting appropriate privacy settings. Third-party-content-object stores may be used to store content objects received from third parties. Location stores may be used for storing location information received from the client devices 906 associated with users.

In addition, the vehicle subsystem 908 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 908 can include an autonomous vehicle—i.e., a vehicle that does not require a human operator. In these embodiments, the vehicle subsystem 908 can perform maneuvers, communicate, and otherwise function without the aid of a human provider, in accordance with available technology.

In particular embodiments, the vehicle subsystem 908 may include one or more sensors incorporated therein or associated thereto. For example, sensor(s) can be mounted on the top of the vehicle subsystem 908 or else can be located within the interior of the vehicle subsystem 908. In certain embodiments, the sensor(s) can be located in multiple areas at once—i.e., split up throughout the vehicle subsystem 908 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor suite can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 908 may include a communication device capable of communicating with the client device 906 and/or the transportation matching system 902. For example, the vehicle subsystem 908 can include an on-board computing device communicatively linked to the network 904 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a provider client device to:
   detect a plurality of wireless broadcast signals from a plurality of auxiliary computing devices at a first time period at a first location, each wireless broadcast signal comprising a particular device identifier for a particular auxiliary computing device;
   determine that a wireless broadcast signal from the plurality of wireless broadcast signals satisfies a signal-strength threshold at the first time period by determining that the wireless broadcast signal corresponds to a strongest wireless broadcast signal from among the plurality of wireless broadcast signals at the first time period, the wireless broadcast signal comprising a device identifier for an auxiliary computing device within a transportation vehicle from among the plurality of auxiliary computing devices;
   determine at a second time period that the provider client device has traveled within the transportation vehicle to a second location that is a threshold distance from the first location;
   detect the wireless broadcast signal from the auxiliary computing device within the transportation vehicle when the provider client device is within the transportation vehicle and located at the second location at a second time period;
   determine that the wireless broadcast signal from the auxiliary computing device satisfies the signal-strength threshold at the second time period; and
   based on determining that the wireless broadcast signal from the auxiliary computing device satisfies the signal-strength threshold at the first time period corresponding to the first location and the second time period corresponding to the second location, initiate a wireless network connection between the provider client device and the auxiliary computing device within the transportation vehicle.

2. The non-transitory computer readable medium of claim 1, further comprising instructions that, when executed by the at least one processor, cause the provider client device to detect the plurality of wireless broadcast signals at the first time period by detecting a plurality of Bluetooth broadcast signals or a plurality of wireless fidelity ("Wi-Fi") broadcast signals at the first time period.

3. The non-transitory computer readable medium of claim 1, wherein the provider client device comprises a provider transport application and the auxiliary computing device comprises an in-vehicle-display device for communicating messages to requestors of a transportation matching system.

4. The non-transitory computer readable medium of claim 1, wherein the auxiliary computing device comprises at least one of a wireless camera, a wireless video camera, a wireless speaker, or a wireless video monitor.

5. The non-transitory computer readable medium of claim 1, further comprising instructions that, when executed by the at least one processor, cause the provider client device to:
   detect the plurality of wireless broadcast signals when the provider client device is located at the first location indicated by a first set of Global Positioning System ("GPS") data from the provider client device at the first time period; and
   determine that the provider client device has traveled within the transportation vehicle to the second location indicated by a second set of GPS data from the provider client device.

6. The non-transitory computer readable medium of claim 1, further comprising instructions that, when executed by the at least one processor, cause the provider client device to:
   detect the plurality of wireless broadcast signals based on the provider client device launching a provider transport application at the first time period; and
   detect the wireless broadcast signal from the auxiliary computing device based on the provider client device launching the provider transport application at the second time period.

7. The non-transitory computer readable medium of claim 1, further comprising instructions that, when executed by the at least one processor, cause the provider client device to:
   detect additional wireless broadcast signals from the plurality of wireless broadcast signals at the second time period; and
   determine that the additional wireless broadcast signals from the plurality of wireless broadcast signals do not satisfy the signal-strength threshold at the second time period.

8. The non-transitory computer readable medium of claim 1, further comprising instructions that, when executed by the at least one processor, cause the provider client device to determine additional wireless broadcast signals from the plurality of wireless broadcast signals are not detected at the second time period.

9. A provider client device comprising:
at least one processor; and
at least one non-transitory computer-readable storage medium storing instructions thereon that, when executed by the at least one processor, cause the provider client device to:
  detect a plurality of wireless broadcast signals from a plurality of auxiliary computing devices at a first time period at a first location, each wireless broadcast signal comprising a particular device identifier for a particular auxiliary computing device;
  determine that a wireless broadcast signal from the plurality of wireless broadcast signals satisfies a signal-strength threshold at the first time period, the wireless broadcast signal comprising a device identifier for an auxiliary computing device within a transportation vehicle from among the plurality of auxiliary computing devices;
  determine at a second time period that the provider client device has traveled within the transportation vehicle to a second location that is a threshold distance from the first location;
  detect the wireless broadcast signal from the auxiliary computing device within the transportation vehicle when the provider client device is within the transportation vehicle and located at the second location at a second time period;
  determine that additional wireless broadcast signals from the plurality of wireless broadcast signals are not detected at the second time period;
  determine that the wireless broadcast signal from the auxiliary computing device satisfies the signal-strength threshold at the second time period; and
  based on determining that the wireless broadcast signal from the auxiliary computing device satisfies the signal-strength threshold at the first time period corresponding to the first location and the second time period corresponding to the second location, initiate a wireless network connection between the provider client device and the auxiliary computing device within the transportation vehicle.

10. The provider client device of claim 9, further comprising instructions that, when executed by the at least one processor, cause the provider client device to detect the plurality of wireless broadcast signals at the first time period by detecting a plurality of Bluetooth broadcast signals or a plurality of wireless fidelity ("Wi-Fi") broadcast signals at the first time period.

11. The provider client device of claim 9, wherein the provider client device comprises a provider transport application and the auxiliary computing device comprises an in-vehicle-display device for communicating messages to requestors of a transportation matching system.

12. The provider client device of claim 9, further comprising instructions that, when executed by the at least one processor, cause the provider client device to:
  detect the plurality of wireless broadcast signals when the provider client device is located at the first location indicated by a first set of Global Positioning System ("GPS") data from the provider client device at the first time period; and
  determine that the provider client device has traveled within the transportation vehicle to the second location indicated by a second set of GPS data from the provider client device.

13. The provider client device of claim 9, further comprising instructions that, when executed by the at least one processor, cause the provider client device to determine that the wireless broadcast signal satisfies the signal-strength threshold at the first time period by determining that the wireless broadcast signal corresponds to a highest detected decibel value or wattage value from among the plurality of wireless broadcast signals corresponding to a plurality of detected decibel values or a plurality of detected wattage values at the first time period.

14. The provider client device of claim 9, further comprising instructions that, when executed by the at least one processor, cause the provider client device to:
  determine that the wireless broadcast signal from the plurality of wireless broadcast signals satisfies the signal-strength threshold at the first time period by:
    ranking the plurality of wireless broadcast signals from the plurality of auxiliary computing devices according to wireless-signal strength; and
    determining that the wireless broadcast signal from the auxiliary computing device corresponds to a highest ranked wireless broadcast signal from among the plurality of wireless broadcast signals; and
  store the device identifier for the auxiliary computing device in one or more non-transitory-computer-readable storage mediums based on determining that the wireless broadcast signal from the auxiliary computing device corresponds to the highest ranked wireless broadcast signal.

15. The provider client device of claim 9, further comprising instructions that, when executed by the at least one processor, cause the provider client device to:
  store the device identifier for the auxiliary computing device based on determining that the wireless broadcast signal from the auxiliary computing device satisfies the signal-strength threshold at the first time period; and
  detect the wireless broadcast signal from the auxiliary computing device at the second time period by scanning for the wireless broadcast signal corresponding to the device identifier for the auxiliary computing device.

16. The provider client device of claim 9, further comprising instructions that, when executed by the at least one processor, cause the provider client device to:
  detect the wireless broadcast signal from the auxiliary computing device at additional time periods in separate intervals;
  determine that the wireless broadcast signal from the auxiliary computing device satisfies the signal-strength threshold at the additional time periods in the separate intervals; and
  based on determining that the wireless broadcast signal from the auxiliary computing device satisfies the signal-strength threshold at the first time period, the second time period, and the additional time periods, initiate the wireless network connection between the provider client device and the auxiliary computing device.

17. A method comprising:
  detecting, by a provider client device, a plurality of wireless broadcast signals from a plurality of auxiliary computing devices at a first time period at a first location, each wireless broadcast signal comprising a particular device identifier for a particular auxiliary computing device;
  determining, by the provider client device, that a wireless broadcast signal from the plurality of wireless broadcast signals satisfies a signal-strength threshold at the first time period, the wireless broadcast signal comprising a device identifier for an auxiliary computing device within a transportation vehicle from among the plurality of auxiliary computing devices;

determining at a second time period that the provider client device has traveled within the transportation vehicle to a second location that is a threshold distance from the first location;

detecting, by the provider client device, the wireless broadcast signal from the auxiliary computing device within the transportation vehicle when the provider client device is within the transportation vehicle and located at the second location at the second time period;

determining, by the provider client device, that additional wireless broadcast signals from the plurality of wireless broadcast signals are not detected at the second time period;

determining, by the provider client device, that the wireless broadcast signal from the auxiliary computing device satisfies the signal-strength threshold at the second time period; and based on determining that the wireless broadcast signal from the auxiliary computing device satisfies the signal-strength threshold at the first time period corresponding to the first location and the second time period corresponding to the second location, initiating, by the provider client device, a wireless network connection between the provider client device and the auxiliary computing device within the transportation vehicle.

18. The method of claim 17, further comprising:

determining, by the provider client device, the auxiliary computing device is unavailable for establishing the wireless network connection;

detecting, by the provider client device, an additional wireless broadcast signal at additional time periods in separate intervals, the additional wireless broadcast signal comprising an additional device identifier for an additional auxiliary computing device;

determining, by the provider client device, that the additional wireless broadcast signal from the additional auxiliary computing device satisfies the signal-strength threshold at the additional time periods in the separate intervals; and based on determining that the additional wireless broadcast signal from the additional auxiliary computing device satisfies the signal-strength threshold at the additional time periods, initiating, by the provider client device, the wireless network connection between the provider client device and the additional auxiliary computing device.

19. The method of claim 17, further comprising:

detecting, by the provider client device, the plurality of wireless broadcast signals based on the provider client device launching a provider transport application at the first time period; and detecting, by the provider client device, the wireless broadcast signal from the auxiliary computing device based on the provider client device launching the provider transport application at the second time period.

20. The method of claim 17, further comprising:

storing, by the provider client device, the device identifier for the auxiliary computing device in a non-transitory-computer-readable storage medium based on determining that the wireless broadcast signal from the auxiliary computing device satisfies the signal-strength threshold at the first time period; and detecting the wireless broadcast signal from the auxiliary computing device at the second time period by scanning for the wireless broadcast signal corresponding to the device identifier for the auxiliary computing device.

* * * * *